United States Patent
Zhang et al.

(10) Patent No.: US 10,713,540 B2
(45) Date of Patent: Jul. 14, 2020

(54) DEEP LEARNING SYSTEM FOR RECOGNIZING PILLS IN IMAGES

(71) Applicant: Board of Trustees of Michigan State University, East Lansing, MI (US)

(72) Inventors: Mi Zhang, Okemos, MI (US); Kai Cao, East Lansing, MI (US); Xiao Zeng, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 196 days.

(21) Appl. No.: 15/913,498

(22) Filed: Mar. 6, 2018

(65) Prior Publication Data

US 2018/0260665 A1    Sep. 13, 2018

Related U.S. Application Data

(60) Provisional application No. 62/468,218, filed on Mar. 7, 2017.

(51) Int. Cl.
*G06K 9/62*    (2006.01)

(52) U.S. Cl.
CPC ......... *G06K 9/6276* (2013.01); *G06K 9/6215* (2013.01); *G06K 9/6259* (2013.01)

(58) Field of Classification Search
None
See application file for complete search history.

(56) References Cited

U.S. PATENT DOCUMENTS

| 9,098,900 B2 | 8/2015 | Helgason et al. |
| 9,251,493 B2 | 2/2016 | Jacobs et al. |

OTHER PUBLICATIONS

Lee, Y.B., et al., Pill-id: Matching and retrieval of drug pill images. Pattern Recognition Letters, 33(7):904-910, 2012.
Caban, J.J., et al., Automatic identification of prescription drugs using shape distribution models. In 2012 19th IEEE International Conference on Image Processing, pp. 1005-1008. IEEE, 2012.
Hartl, Computer-Vision based Pharmaceutical Pill Recognition on Mobile Phones, Proceedings of CESCG 2010: The 14th Central European Seminar on Computer Graphics (non-peer-reviewed), 8 pages.
Lee, et al., Pill recognition using image processing and neural networks, Gerontechnology 2014;13(2):235.

*Primary Examiner* — Idowu O Osifade
(74) *Attorney, Agent, or Firm* — Quarles & Brady LLP

(57) ABSTRACT

A system and method is provided that utilizes deep learning, including convolutional neural networks, to identify subject objects in unconstrained user images such as unknown pills. An image of, e.g., a pill, may be captured and subsequently processed using deep learning models to identify the pill. The deep learning models may be optimized to have a small footprint (in terms of computational and memory resources) suitable for a resource-limited device such as a smartphone while retaining a high object recognition accuracy. Each such model may also be run on modified versions of the unconstrained image, for example on color, greyscale, and gradient images, to focus the models on different distinguishing features of the object.

33 Claims, 11 Drawing Sheets
(9 of 11 Drawing Sheet(s) Filed in Color)

DEEP LEARNING SYSTEM FOR RECOGNIZING PILLS IN IMAGES

CROSS REFERENCE TO RELATED APPLICATIONS

This application claims priority from U.S. Provisional Application No. 62/468,218 filed Mar. 7, 2017, which is hereby incorporated by reference as if fully set forth herein.

STATEMENT REGARDING FEDERALLY SPONSORED RESEARCH OR DEVELOPMENT

Not applicable.

FIELD OF THE INVENTION

Embodiments of the present disclosure relate generally to object identification in images, such as automated pill identification, and more particularly, to the use of deep learning, such as through the use of convolutional neural networks (CNNs) in mobile applications, for recognizing pills in unconstrained user images.

BACKGROUND

Previously, attempts have been made to develop systems for identifying pills by medication type from images (optical or laser) taken of the pills. If accurate, such systems would be useful for the ability to effectively identify medications that may have been separated from their original packaging, or about which there is otherwise some uncertainty or need for confirmation as to their identity. For example, a user could take a picture of an unknown pill, and be told what the medication type and dosage is for that pill. However, tolerances for inaccuracy or misidentification of a pill can be small, given the importance of properly identifying and administering the right prescriptions. Moreover, the availability, reliability and timeliness of a pill identification is critical, yet is dependent upon system architecture and available system resources. In this sense, as existing systems become more complex and adopt specialized systems to attempt to become more accurate, they sacrifice reliability and timeliness. And, in many cases, they become essentially unavailable to the average member of the public given their complexity.

More specifically, existing approaches to pill identification through image analyses have not been accurate enough, due in large part to their inabilities to overcome the challenges that stem from inherent variability in image attributes (such as white balance, focus, blurriness, the orientation of the pill, whether the pill is centered in the image, and ambient color casting to name a few). The development of a pill recognition system is thus challenging in part because, in real-world scenarios, the quality of photos taken by users varies dramatically, and can be easily deteriorated by a variety of factors such as illumination, shading, background color, blurriness, and phone orientation. Two images of the same pill may have drastically different appearances depending on, for example, the lighting conditions, angles, phone settings, etc. For example, FIGS. 1A-1F depict pairs of images of the same pill, wherein the left image in each pair suffers from various types of degradation including blurriness, shadowing, and background blending. Moreover, the number of types of prescription pills manufactured by pharmaceutical companies is very large, and they may appear similar or identical to other pills. Existing solutions are not capable of handling such large number of types and thus fail when the problem scale is increased considerably. This is the case despite the fact that each manufactured pill (prescription or otherwise) may be uniquely characterized by, for example, the combination of its shape, color, and particularized imprints.

Attempts to overcome these image variability challenges have resulted in increased complexity and inflexibility. For example, some techniques aim to simply avoid image inhomogeneity altogether, by trying to force the user to make the user's images more uniform. FIG. 2 depicts one such attempt, which relied upon a wallet-sized target card 10 with a known border 12, and checkerboard pattern 14 onto which the unknown subject pill(s) 16 would be placed. This system forced the user to try to center the image, take the image from a certain distance, and try to correct white balance. Even then, the system was still insufficiently accurate as it relied on a predetermined and inflexible set of features to be analyzed. For example, the system attempted to measure the real world length and width of the pill 16 (attributes that might be distinguishing to the human eye, but not necessarily as distinguishing to a computer), which again is dependent on how far away the image was taken from the pill 16 and necessitates the use of the predetermined checkerboard background 14. As another example, some systems have used enclosed chambers that force more uniform image conditions, often using laser images to detect pill contours. Such systems may be too complex for the average individual, and would generally be unavailable for use in emergency situations or in any environment other than the lab in which the system was set up.

Other attempts have involved the use of machine learning to improve the ability of a system to distinguish pills despite the presence of image inhomogeneities. However, these systems suffer from two problems of their own. First, the computational demands of such systems make them difficult to implement. Generally they require either high memory and computational resources onsite, or a fast and robust network connection to a remote computational service. Additionally, even despite the increased amount of computation involved, such systems still are not accurate enough in the face of the types of variability that can be encountered from untrained users taking images.

Conventional machine learning-based approaches to recognition problems are generally very expensive in terms of computation, memory, and power consumption. Given the resource constraints of the types of devices that a user would want to employ for a mobile, flexible pill recognition system (e.g., cell phones, handheld readers, etc.), most of the existing deep learning-based mobile vision systems offload the workload to another computational resource (for example, relying on "cloud"-based computation or transferring data to another networked computer for processing). However, this approach can, depending upon the circumstances, suffer from one or more of several undesirable shortcomings. For example, if network connectivity is lost or otherwise unavailable, the task at hand cannot be accomplished because the data cannot be transferred for processing, and/or results cannot be retrieved. There can be unpredictability in the delay that will be experienced task-to-task and day-to-day. For example, depending on the distance between the device and the networked computer, the network bandwidth available, the quantity of data to be transferred, the current demands on the processing power of the networked computers, scheduled maintenance, power loss, etc., there can be great variability in the length of time required to achieve a pill recognition task—and even whether the task can be performed at all.

Even aside from the computational and memory needs (and concomitant security and reliability risks) of such machine learning systems, they still have not been shown to be sufficiently accurate. Because these systems rely on simple or conventional machine learning algorithms, they are unable to focus the feature recognition result (i.e., the "learnings" of the algorithms) on the proper distinguishing features of images. Thus, they are more susceptible to errors caused by image fluctuations and, as a result, cannot handle the range of possible image types that a user might submit to the system.

In view of the above, a need exists for a system that may provide a simple to use, yet robust and highly accurate pill recognition system, and may be constrained in terms of its computational and memory needs such that it may be operated on a mobile device (or other similar device having limited computational and/or memory resources) without the need to rely on external computing resources. It is within this context that embodiments of the present disclosure arise.

SUMMARY

The present disclosure relates to the design, implementation, and evaluation of exemplary small-footprint deep learning systems and methods that can achieve substantially improved recognition of unconstrained pill images with or without the support of cloud servers. Without limitation, one such implementation, specific to an application involving the use of mobile phones to recognize pills is referred to herein as "MobileDeepPill." Other implementations, for example, may be carried out on a variety of devices and in a multitude of settings, such as a personal computer, a smartwatch, smart glasses, and similar devices and settings. Using a picture of a pill taken using a smartphone, MobileDeepPill is able to accurately recognize the pill in the picture, and optionally display the corresponding reference pill image along with important information associated with the pill (e.g., uses, side effects, precautions) to the user. However, unlike systems contemplated in the past, this high accuracy can be achieved entirely by a process operating within the mobile device itself.

MobileDeepPill may use pill image recognition processes involving, for example, deep convolutional neural networks (CNNs). In some other embodiments, a multi-CNNs architecture that combines knowledge (e.g., trained CNN parameters) extracted from three CNNs (each trained on either shape, color, or imprint characteristics of pills) may be used. In some other embodiments, other numbers of CNNs could be used, such as four or more CNNs wherein the CNNs are trained with respect to additional sensor inputs and/or additional image qualities (such as a CNN focused solely on texture or smoothness/coating of a pill—e.g., whether a pill is matte or glossy from a coating), or two CNNs (e.g., with a first CNN trained on color images and a second CNN trained on either grayscale images or gradient images). Further, each of the CNNs may operate using what may be referred to as a "triplet loss" technique to further focus the CNNs on relevant characteristics of the reference and target pill images. MobileDeepPill may also incorporate a deep learning model compression technique based on a novel teacher-student learning paradigm. This compression technique can significantly reduce the size and computational cost of the larger deep learning model (i.e., teacher network) with a negligible recognition accuracy drop by training a much smaller model (i.e., student network) that is able to imitate the outputs of the larger model. As a consequence, MobileDeepPill is capable of performing accurate pill image recognition on smartphones efficiently and effectively.

BRIEF DESCRIPTION OF THE DRAWINGS

The present invention will hereafter be described with reference to the accompanying drawings, wherein like reference numerals denote like elements. The patent or application file contains at least one drawing executed in color. Copies of this patent or patent application publication with color drawing(s) will be provided by the Office upon request and payment of the necessary fee.

DETAILED DESCRIPTION

Correct identification of prescription pills based on their visual appearance facilitates more effective patient care. There is therefore a desire for an efficient pill recognition tool that can provide people with an elegant way to recognize mystery pills, help prevent unnecessary medication errors, and in urgent cases, save people's lives. Yet the need for an automated pill recognition solution is presently unmet. The systems and methods disclosed herein are examples of ways to implement such a solution; however the features, attributes, and innovations of such systems and methods that allow them to operate so favorably are also applicable to other object and image recognition tasks (and related sensing applications) that have similar goals and constraints. In other words, the innovations adopted in the MobileDeepPill embodiment can be applied to the development of a wide range of mobile sensing systems that are amenable to being utilized in conjunction with on-device deep learning algorithms. Specifically, the proposed multi-CNNs architecture can be used to build mobile sensing systems that perform inferences based on combining information extracted from multiple sensor modalities. Moreover, the proposed deep learning model optimization technique allows practitioners to adopt robust (and, thus, large) deep learning models, but using a much smaller actual footprint (in terms of memory, power, and computation) for resource-limited platforms like smartphones, handheld devices, and other limited devices.

1. MOBILE PILL RECOGNITION

As noted above, it is generally desirable to reduce or altogether eliminate constraints on the type of image that a pill recognition system can accurately process, so that untrained, unskilled individuals in virtually any real world setting can simply take a picture of a pill and be provided an accurate identification of that pill. However, accurately recognizing pills from images taken by, for instance, smartphones in unconstrained real-world scenarios by untrained individuals presents a number of technical challenges. These challenges are unmet by existing systems, and many are not even recognized as problems to be solved. Accordingly, the discussion of embodiments of the present disclosure will begin with a discussion of these technical challenges.

1.1 Technical Challenges and Problems Solved

Figure 1B:
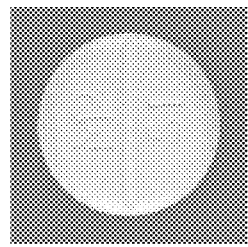
FIGS. 1A-1F show illustrative image pairs, each image pair including an image of a pill captured in an uncontrolled environment and an image of a pill captured in a controlled environment.
Figure 1B:
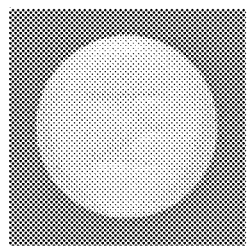
Figure 1B:
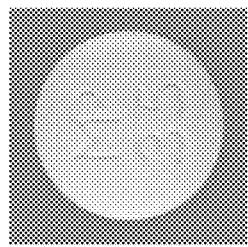
Figure 1B:
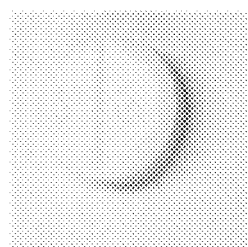
Figure 1D:
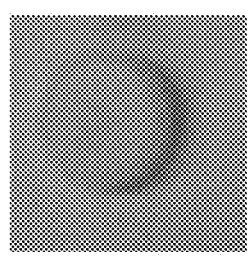
Figure 1F:
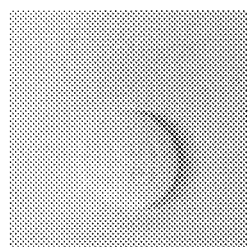
Figure 1A:
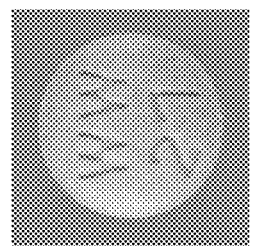
Figure 1A:
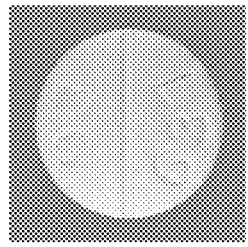
Figure 1A:
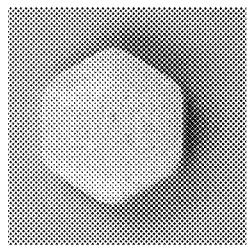
Figure 1A:
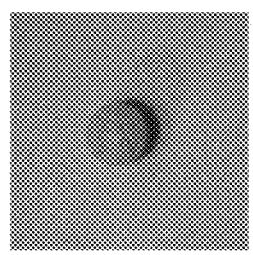
Figure 1C:
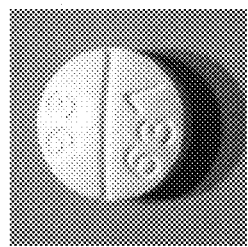
Figure 1E:
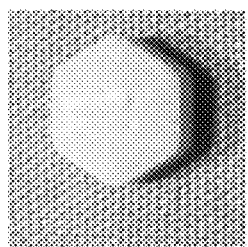
Figure 2:
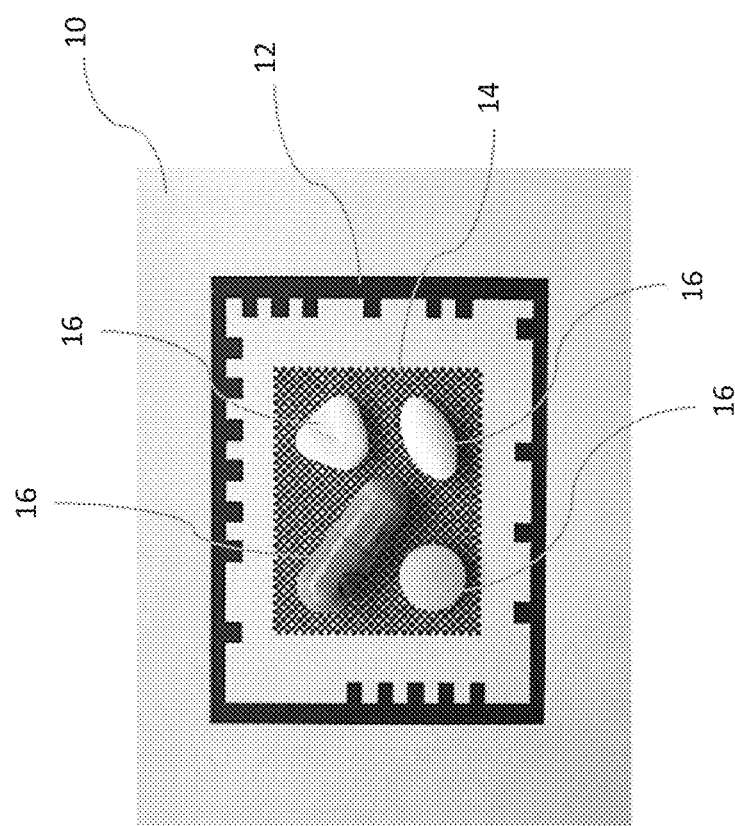
FIG. 2 shows a controlled environment for capturing images of pills.

First, although each prescribed pill is uniquely characterized by the combination of its shape, color, texture, and imprints, these unique qualities can be deteriorated or changed in images taken by untrained individuals, due to a variety of conditions caused by real-world settings such as shading, color casting, incorrect white balance, distance, suboptimal perspective, blur, illumination in the environment, and a suboptimal background the pill is on. For example, FIG. 1A depicts that, depending on how far away an individual was when he or she took a picture, the size of the pill may appear larger or smaller. This can effectively negate the use of pill size as a distinguishing characteristic for some image processing techniques. As another example, depending on what background the pill was on and the ambient light in the room, the pill's color in a consumer image may look very different from the color in a reference image. FIG. 1B is an example of a pill that might have a yellow color, but was in a room with yellow walls (causing yellow color casting) or yellow light, causing the background of the image to also look yellow. This, as can be seen, reduces the amount of data that is available for some types of image processing techniques to distinguish the pill from the background. FIG. 1C shows that shading (e.g., shadow casting) can create areas of contrast in an image that do not actually correspond to the shape of the pill, but which can confuse certain types of image processing techniques that rely on, for example, contrast alone to determine pill shape. FIG. 1D shows that a blurry or out-of-focus image can hide unique characteristics of an image, such as a proprietary imprint or trademark on a pill. FIGS. 1E and 1F show that the background in a pill image can make recognition more difficult by, for example, making edges more difficult to distinguish. To address these challenges, MobileDeepPill first localizes the pill in the image to remove irrelevant data from the image's background, and then generates color, grey, and gradient (or, "gradient magnitude") images from the original pill images which are then respectively processed by three independent CNNs. By combining the outputs (e.g., feature arrays) produced by these three CNNs, MobileDeepPill not only captures information related to the pill's shape, color, texture, and imprint but also becomes robust to real-world noise and image inhomogeneity.

Second, one goal of mobile pill image recognition is to match consumer pill images taken in real-world settings to reference pill images taken by high-resolution professional cameras in a well-controlled laboratory setting (e.g., by a government agency or standard setting organization). However, as illustrated in FIGS. 1A-1F, due to the deterioration caused by various real-world noise, consumer images and reference images of the same pills may look very different. As such a pill recognition system's performance will suffer if the system's recognition model is trained using the ideal reference images, but subsequently attempts to recognize pills appearing in drastically different-looking consumer images. To address this challenge a CNN model has been developed that employs a triplet-based loss function to minimize the difference between consumer images and reference images of the same pill, while maximizing the difference between consumer images and reference images of different pills. As such, MobileDeepPill can accurately pair consumer images and reference images of the same pill together even for cases in which a consumer image and a corresponding reference image look very different.

Third, due to the deep architecture, training a CNN requires a large volume of training samples. However, collecting a large number of labeled real-life consumer images deteriorated by various real-world noises for all types of prescription pills may be difficult. To address this challenge, a number of data augmentation techniques may be performed on both consumer and reference images to generate new augmented images. The data augmentation techniques mimic the noisiness of the real world shown in FIGS. 1A-1F. In this way, enough samples may be generated to effectively train CNNs.

Fourth, when there is no internet connectivity or other networked transmission, the pill image needs to be fully processed within the user's own device. However, the novel CNN architecture and methods disclosed herein would normally consume a relatively very large amount of memory and a very high computational drain (e.g., in the order of giga floating-point operations per second (FLOPS)). Although personal devices such as smartphones may be equipped with powerful computing resources, they generally are not able to support such CNNs, or at least the sorts of CNNs that would generally only be able to be handled by comparatively more powerful computers. It can be recognized that even future advancements in mobile processing power and memory may not alone overcome this problem, for several reasons. First, operating systems and system functions increase in complexity, memory, and computational demand along with advancements in memory size and processing power. Second, manufacturers may be more inclined to optimize their devices to perform more routine functions (such as internet browsing, call routing, etc.), rather than optimizing them to run applications such as the disclosed CNN processes which involve a high number of computations, and may not be inclined to add any increased general processing power to all or any of their models. To address the challenge of allowing mobile devices to run a high computation CNN system, MobileDeepPill adopts a novel deep learning model optimization technique based on a technique that may be referred to as "Teacher-Student Learning." This technique may significantly reduce the memory and computational requirements of a larger scale CNN system (such as the three part pill identification CNN discussed above), without deteriorating the recognition performance, such that the CNN system can be effectively operated locally on a resource-limited device like a smartphone.

Embodiments disclosed herein represent the first solution to the aforementioned challenges that still achieves one or more of the goals of high accuracy and flexible, mobile, cloud-free use.

1.2 Example System Overview

Figure 3:
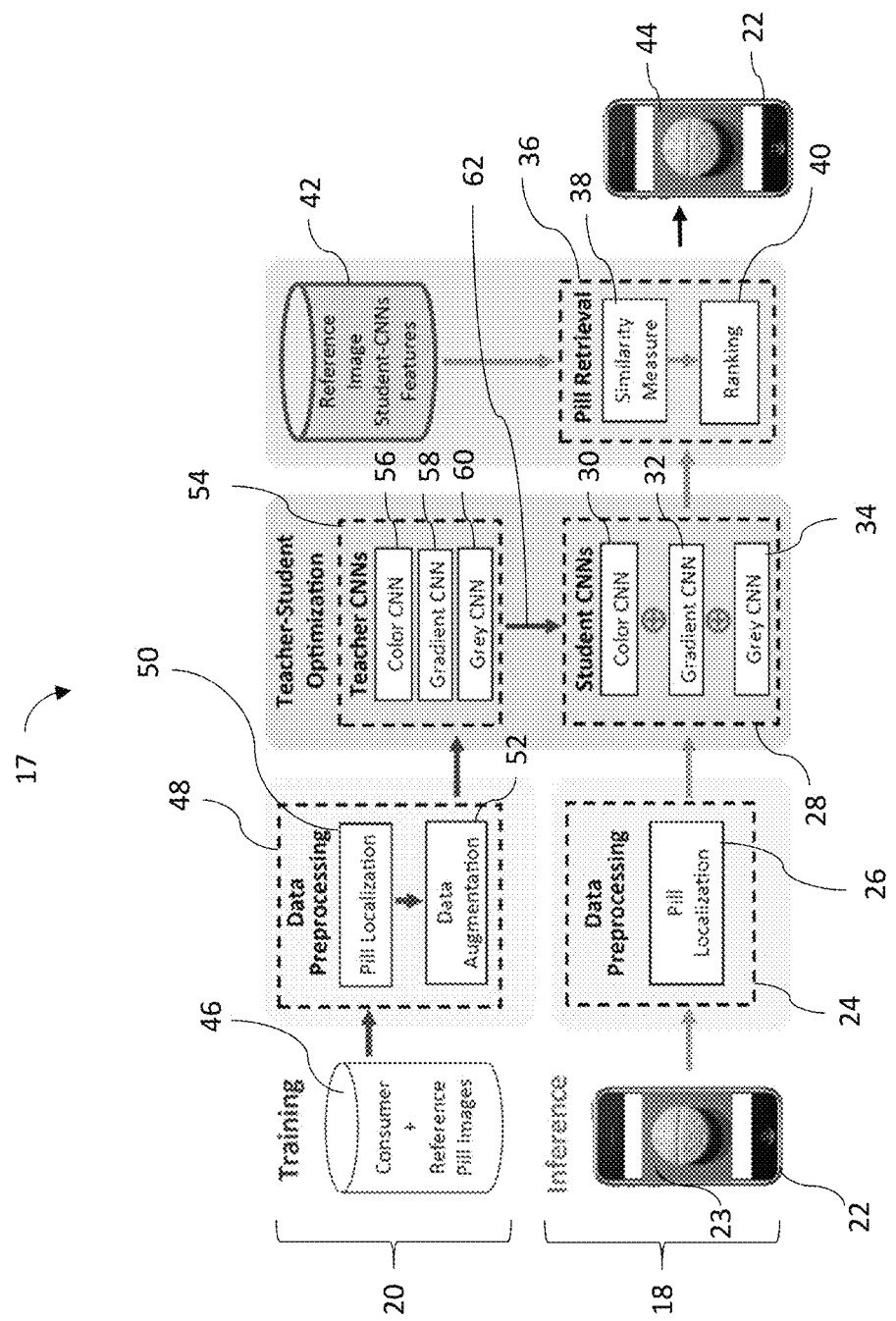
FIG. 3 is an illustrative block diagram showing a system architecture by which multiple convolutional neural networks (CNNs) may be trained and used to determine the identity of an object such as a pill, in accordance with aspects of the present disclosure.

An overview of one implementation of the systems and concepts disclosed herein, that can overcome the aforementioned challenges, is shown in FIG. 3, which depicts a system architecture 17 (sometimes referred to herein as "system 17") that may determine a probabilistic identity of a pill based on one or more images of the pill. The CNN architecture used here may be an AlexNet architecture in some embodiments, or may be any other applicable deep neural network architecture, such as VGGNet, ResNet, or GoogLeNet/Inception. A functional block diagram of a process 18 depicts the phases of an actual operating embodiment (also referred to as an inference module) implemented via a smartphone 22, and a companion block diagram of a process 20 depicts how the intelligence of the embodiment is developed and then reduced to a more manageable footprint (also referred to as a training module). As shown, the training module and the inference module may contain comparatively different system components.

In operation, a smartphone 22 of a user captures an image 23 of a subject pill. The image 23 undergoes data preprocessing 24, which may include the execution of processes 26 which may include: centering and localizing the pill in the image 23, cropping or reducing unnecessary background, quality control (e.g., identifying to the user if, for example, the pill was cut-off or missed, a finger was covering the camera lens, the lens is dirty, or some other error occurred such as a corrupt or zero byte file), image segmentation, and other similar tasks. Additionally the data preprocessing 24 will generate three versions of the image 23—the original image in full color, a greyscale version of the image, and a version of the image that highlights the gradients (e.g., to focus on edges, imprints, and other areas that include pronounced changes in color, brightness, contrast, etc. The data preprocessing 24 may be executed by processing hardware on the mobile device 22 itself, but could be outsourced to another device (e.g., a networked computer, a cloud resource, or a computing device connected via a NFC or Bluetooth connection). Next, the three versions of the image generated during the data preprocessing 24 may be processed by a three-part convolutional neural network (CNN) system 28. This system of CNNs may comprise a Color CNN 30 trained to process full color images, a Gradient CNN 32 trained to process gradient images, and a Grey CNN 34 trained to process greyscale images. By using these three CNN variations for CNNs 30-34 to process the three versions of the image 23, the CNN system 28 is better able to overcome the types of image degradations and inhomogeneities that come from unconstrained images, such as discussed above with respect to FIGS. 1A-1F. The outputs (i.e., the features or feature arrays) produced by the CNNs 30-34 are then used to perform a pill information retrieval 36. In this phase, the feature arrays output by each of the CNNs are expressed in terms of a similarity measure 38. In other words, the feature arrays are compared with feature arrays of reference images stored in a database 42. Finally, a ranking 40 may be generated (e.g., in a descending order) based on the similarity between the input image 23 and all the reference images stored in the database 42. Based on the ranking 40, the reference images of the top N pill candidates are returned to the user via a graphical user interface (GUI) 44 of, e.g., an app running on the smartphone 22, where N is a predetermined value which may be set by a user or which may automatically be set to a default value. As the user selects among the displayed reference images, key information associated with the pill (e.g., uses, side effects, precautions) will be displayed to the user via the GUI 44 to provide the user even further confirmation of the identity of the pill. Alternatively where the features identified by the CNNs result in a high degree of confidence that the top ranked reference pill as defined by the ranking 40 is in fact the identity of the pill in the image 23, then the system 17 may merely output one result so as to reduce user confusion. In another alternative, the system 17 may be programmed to request that the user retake additional pictures in suggested orientations to improve the confidence of the output ranking 40. In doing so, a set of virtual guidelines may be displayed on the screen of the smartphone 22, and/or text and voice prompts may be used, to aid the user in aligning the image while taking one or more additional pictures. The resulting captured images may then undergo the same process 18, but with the knowledge that the images are all of the same pill, which may aid the system 17 in improving its prediction of the pill.

In the training stage, the process 20 begins with a set of consumer (e.g., "real world") images and a set of references images 46. The system 17 first performs data preprocessing 48 on all consumer and reference images 46, including processes 50 such as localization and segmenting the pills in the images 46. The training stage then includes a data augmentation phase 52, in which a number of techniques may be performed on the preprocessed and segmented consumer and reference images to generate new augmented images to increase the number of training samples for training CNNs 56-60 of a Teacher CNN system 54. For every original and augmented image in the training set, the system 17 generates, during data preprocessing 48, color, gradient, and grey versions to train three independent Teacher CNNs: a Color CNN 56, a Gradient CNN 58, and a Grey CNN 60. Finally, trained versions of the three CNNs 56-60 are imported into the Teacher-Student Optimization framework 62 (further described below) to derive three small-footprint Student CNNs 30-34.

Next the various concepts and components of such a system will be described in greater detail.

1.3 Detailed Description of System Components and Techniques 1.3.1 Data Preprocessing As shown in FIG. 3, the first phase for both the inference module 18 and training module 20 may include data preprocessing. As discussed above, real-world images can contain a variety of unwanted data that is not helpful to pill identification. For example, the backgrounds of pill images do not contain useful information to help identify pills and can be a source of noise in real world settings. Alternatively, an image may contain multiple different types of pills, confusing foreign objects, or may be simply a bad image. Therefore, it is beneficial to preprocess the images to streamline and optimize them for the subsequent CNN steps. Thus, it is desirable to first run a quality control check on the images (e.g., to determine whether they are corrupt, have data, and depict an object that can be isolated as the subject pill). If the images are of a sufficient quality, then the system will proceed to localize and segment the pill in both consumer and reference images, so that more meaningful pill information can be extracted.

The reference images will generally be images were taken by high-resolution professional cameras in well-controlled lab settings by an agency, manufacturer, or other organization. Thus, the backgrounds of reference images are typically uniform and only contain plain texture. As such, a gradient detection method may be used to localize and segment pills in reference images. Specifically, the gradient detection method finds the image gradients that exceed a given threshold, which usually correspond to the boundary and imprints of the pill. Thus, these gradients strongly imply the location of the pill in the reference image. Using morphological image operations, the largest connected region, which is also the region of the pill in the reference image, is obtained.

Figure 4:
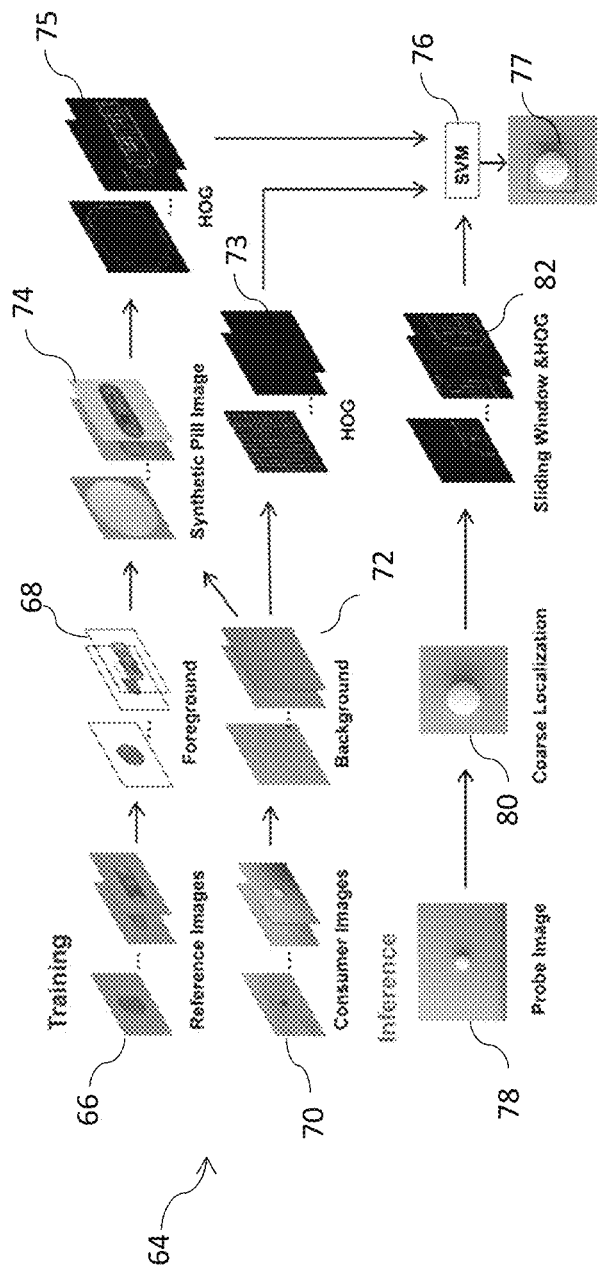
FIG. 4 is an illustrative block diagram showing training and inference modules of a consumer image localization system, in accordance with the present disclosure.

In contrast, however, directly applying the gradient detection method to consumer or "real-world" images does not achieve good performance because consumer images contain diverse backgrounds. To address this problem, the systems and methods disclosed herein may use a learning-based approach to train a pill detector using histogram of oriented gradients (HOG) and what may be referred to as a Support Vector Machine (SVM). FIG. 4 provides a graphical overview of the functionality of one such consumer image localization system 64. Specifically, the system 64 takes advantage of the localization results 68 of reference images 66 and uses them as positive localization samples 74. An operator can manually extract backgrounds 72 of consumer images 70 and use them as negative localization samples. The system 64 then uses these positive 74 and negative 72 samples as training data and computes the histogram of oriented gradients (HOG) 73 and 75 of each sample as features to train the SVM-based pill detector module 76. After the SVM 76 is trained, the system 64 can localize and segment the pill in a real-world, noisy image 78 by first using the gradient method to obtain the coarse location 78 of the pill in the image. A sliding window, computer vision technique 82 is then used to crop image patches inside the coarse region. The HOG descriptors of these patches are then fed into the trained SVM 76. The patch 77 determined by the SVM 76 to have the highest probability is considered as the pill location.

However, there may be instances where the coarse pill location of a consumer image 78 is not readily identifiable due to additional or overlapping objects in the picture. Thus, the gradient detection method can also be used for quality control—for example to determine whether there are multiple pill types or other confusing foreign objects in the image (such that it is unclear which target pill the user wants to identify). While such a quality control process can be used to detect and ignore certain obvious types of foreign objects (e.g., a portion of a finger covering the camera lens, or the presence of a pill box in which the pill is resting) by implementing simple thresholding techniques, this type of preprocessing can also trigger smartphone 22 to generate and display a message to the user that a new picture should be taken (e.g., without the foreign object in it or with only one pill at a time). Alternatively, if more than one pill exists in an image, but the pills are readily identifiable as separate objects (e.g., they do not have overlapping boundaries), then the system 64 could also simply be programmed to run the pill identification process separately for each pill. As another alternative, in instances where the system 64 detects a number of possible objects of interest within a submitted image (some or all of which might be pills), or even in all instances for increased certainty, the interface of the system 64 could simply prompt the user to utilize the touchscreen to identify where in the image the pill or pills of interest is/are located. The system 64 could then use that indication to select one or more coarse locations based on the gradient detection method described above, and proceed accordingly.

In practice, the above-described pill localization techniques may be implemented through the use of tools such as computer vision applications and image processing software. For example, because photos taken by smartphones tend to be high-resolution (or at least users tend to use high resolution settings), image processing software may be used to first down-sample an image submitted by a user to a lower size, such as 800×600 pixels. Then, a computer vision application may be programmed to perform the coarse-grained localization using the gradient method described above. After coarse-grained localization, the image may be resized and cropped using the image processing software such that the pill region is smaller (e.g., 200×200), and centered within an overall smaller image size (e.g., 500× 500). Then, the system 64 may use HOG descriptors (implemented through computer vision applications) and a pre-trained SVM detector (as described above) to perform fine-grained localization. In such an implementation, the detection window size may be set to 250×250 pixels, with a stride length of 8. After fine-grained localization, the system 64 may crop out the pill image, further resizing it (e.g., to 227×227), and generate the corresponding gradient and grey images using the computer vision and image processing tools. The resulting image (e.g., a 227×227 RBG image of the pill) along with its gradient magnitude and grey versions may then be used as the inputs to the CNNs.

1.3.2 Data Augmentation

During the training phase 20 for the Teacher CNNs 54, it may be desirable to augment available image data, rather than attempting to find enough existing images of pills to train the CNNs 54. Generally speaking, a relatively large number of training images is desirable to optimize the performance of CNNs. Due to the potential for lack of sufficient pill images for training, the systems and methods disclosed herein may include an option for applying three data augmentation techniques to preprocessed/segmented pill images to augment the available training dataset. Specifically, the system can: utilize Gaussian filtering to simulate the blur introduced by certain types of cameras (e.g., smartphone lenses) or unskilled users; zoom the images by a random factor in the range of (0.8 to 12) to ensure the CNNs are robust to pill size variations; and apply randomly translating (in the range of (−5.5) pixels) and rotating (in the range of (−6.6) degrees) to pill images to ensure the CNNs are less sensitive to localization errors.

1.3.3 Feature Learning—Triplet Loss

One goal of pill recognition as described herein is to match consumer images and reference images of the same pills. However, as illustrated in FIGS. 1A-1F, due to the deterioration caused by real-world noise, consumer images and reference images of the same pills may look very different. To this end, the MobileDeepPill system may employ a triplet-based loss function (i.e., triplet loss) to address this challenge. In the context of mobile pill recognition, triplet loss is used to optimize the training process for the Teacher multi-CNN network, such that features are recognized that minimize the differences between consumer images and reference images of the same type of pill, while maximizing the differences between consumer images and reference images of different types of pills.

The triplet loss function takes three images as its input: an anchor consumer or "real world" pill image (i.e., anchor image) $I^a$, a reference image of the same pill (i.e., positive image) $I^p$, and a reference image of any other pill (i.e., negative image) $I^n$. The objective of the triplet loss approach is to find an embedding f(I) from image I into a d-dimensional feature space $\mathbb{R}^d$, such that in the feature space, the anchor image is closer to all positive images, independent of the deterioration caused by real-world noises, than it is to any negative image. This triplet loss function can thought of as one implementation or application of the following overall concept:

$$\|f(I^a)-f(I^p)\|_2^2+\alpha<\|f(I^a)-f(I^n)\|_2^2 \qquad (1)$$

The triplet loss function is then formulated as:

$$\mathcal{L}=\max(\|f(I^a)-f(I^p)\|_2^2-\|f(I^a)-f(I^n)\|_2^2+\alpha,0) \qquad (2)$$

where α is a margin that controls the distance imposed on the positive pair ($I^a$, $I^p$) and negative pair ($I^a$, $I^n$). For the MobileDeepPill implementation, a has been determined empirically to be set to 1.0 for best recognition performance, though other settings for the α will also work.

One challenge to be overcome when using triplet loss for pill recognition is to ensure that the system is using the correct triplet images. This is because triplet images that are generated using random combination methods do not contain much useful information. As a result, such triplets do not contribute the necessary improvement to the multi-CNN training of the MobileDeepPill application, and lead to slow convergence when training the CNNs.

To address this problem, a new technique has been designed that generates useful triplet images from intermediate results during the Teacher CNN training process. Specifically, the technique generates triplet images based on the system's current pill ranking. For each image in the augmented dataset (i.e., generated from the process described in Section 1.3.2 above), the system treats it as $I^a$ and randomly selects $I^p$ from the samples that are from the same class. The system then leverages the current ranking of $I^a$ to choose a neighboring pill in the ranking to be $I^n$. The goal is that the CNN should learn the distinctive features among different pills, especially among pills that are similar to each other. As example, where an image $I^a$ exists and its corresponding reference image ranks 10th, the system randomly selects a different pill that ranks close to 10th to be the negative class (i.e., the $I^n$). This triplet generation scheme successfully generates useful triplet images that contribute to improving the Teacher CNN model and improve convergence speed during the training process.

1.3.4 Feature Learning—Multi-CNN Architecture

Figure 5:
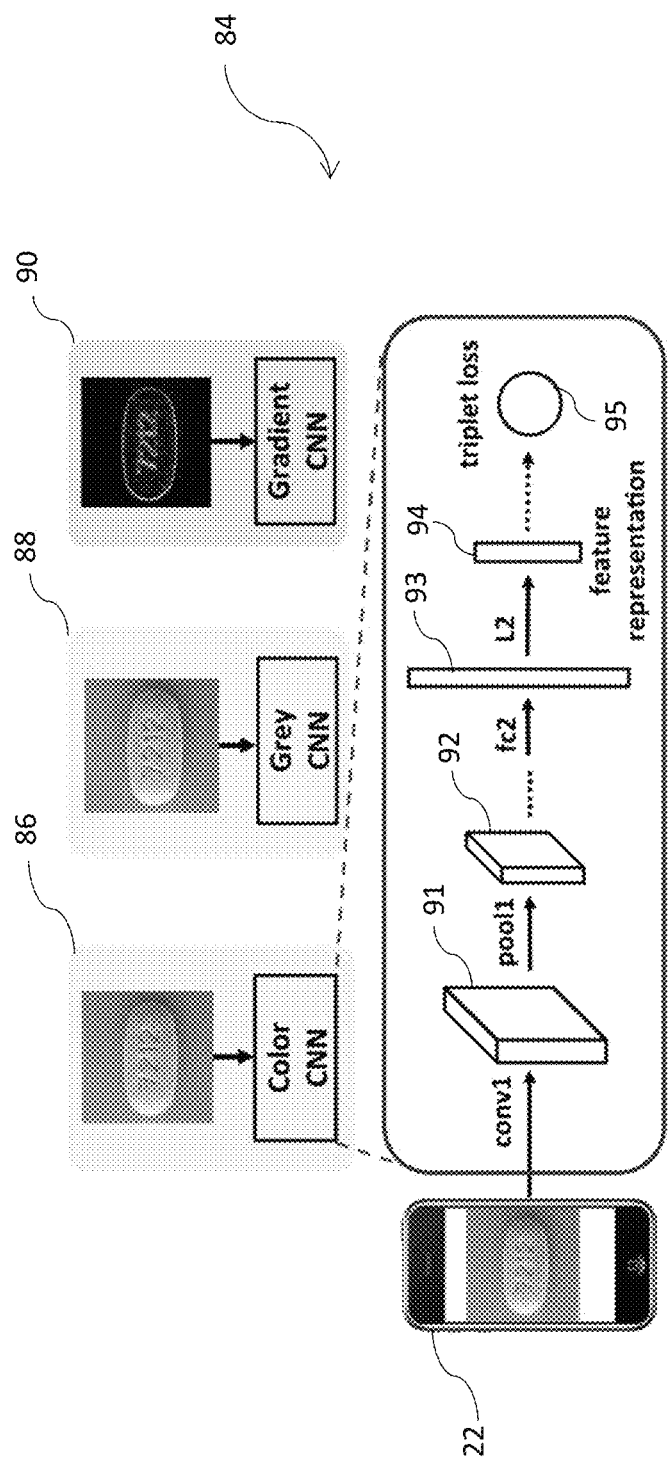
FIG. 5 is an illustrative block diagram showing low level structures of CNNs that may be used for object identification, in accordance with aspects of the present disclosure.

FIG. 5 is a functional block diagram showing the makeup of the multi-CNN architecture 84 of the MobileDeepPill system. As illustrated, the multi-CNNs architecture consists of three independent CNNs: a Color CNN 86, a Gradient CNN 88, and a Grey CNN 90 (e.g., which may correspond to CNNs 30-34 and/or CNNs 56-60 of FIG. 3). Each CNN (for both the Teacher CNNs and Student CNNs) may be implemented using, for example, MXNet (version 0.7.0) or another lightweight deep learning framework that is optimized for running deep learning algorithms on resource limited platforms.

However, in some embodiments other numbers of CNNs may be used, such as one CNN, two CNNs, or four or more CNNs. For example, in an embodiment, a device (e.g., a smartphone device or a cloud server device) that is processing a captured image of a pill may determine that there are insufficient computational resources available to process the captured image using three CNNs, and so the device may instead dynamically determine (e.g., based on user settings or automatically) that it would be most beneficial to process the captured image using one CNN or two CNNs depending on the amount of resources that are determined to be available. As another example, a mobile device or cloud server may determine that the quality of connectivity between the cloud server and the device on which the image of the pill was captured is less than a predefined connectivity quality or security threshold (e.g., based on packet latency, packet loss, or bandwidth). In response, the mobile device or cloud server may automatically select only one CNN or only two CNNs for use in processing the captured image of the pill in the interest of efficiency. As another example, a smartphone may determine that the percentage of available processing power of a processor of the smartphone is less than a predefined processing power threshold (e.g., <20% of the smartphone's processing resources are available). In response, the smartphone may automatically select only one CNN or only two CNNs for use in processing the captured image of the pill in the interest of efficiency. In certain embodiments, the mobile device may then notify the user that the resulting determination is "preliminary," that further computation is being conducted, or other notification signifying that less than the full complement of analysis was performed. In other embodiments, if less than the desirable number of CNNs was used in processing in the interests of speed or efficiency, the device may be configured to automatically reinitiate a processing of the image after an initial processing was performed (e.g., immediately after returning a preliminary result, or when the connectivity or resource limitation is resolved).

In the MobileDeepPill implementation shown in FIG. 5, the three CNNs 86-90 play different roles and extract complementary features that collectively capture the shape, color and imprints characteristics of pills that are identified through MobileDeepPill. Specifically, the Color CNN 86 is responsible of extracting color information of the pills in subject images; and the Grey CNN 88 and Gradient CNN 90 are responsible of extracting shape and imprints information of the pills in the same images.

All three CNNs 86-90 may have the same general network architecture, except for the first convolutional layer. This is because for the Color CNN 86, the input data is the RGB color information from the subject image and thus the number of input channels is three, whereas for the Grey CNN 88 and Gradient CNN 90, the input is the grey and gradient images respectively and thus the number of input channels is one. In other embodiments, one or more of the CNNs could have a different general architecture, however. Table 1 provides the details of the network architecture of the Color CNN 86 of FIG. 5. As shown, the network architecture of Color CNN 86 includes convolutional layers 91 (e.g., conv1 to conv5), pooling layers 92 (pool1, pool2, and pool5), and fully connected layers 93 (fc1 and fc2). It should be noted that only one of each layer is shown in FIG. 5 for the sake of brevity. Finally, on top of the fc2 layer, a L2 normalization layer 94 is added to output the feature representation (e.g., feature array) f(I). However, it is to be understood that other embodiments of the system may be implemented using more or fewer convolutional layers, pooling layers, fully connected layers, and normalization layers, and that the size of the input for each layer may vary as well, though the inventors have found that the sizes shown below have worked well for the MobileDeepPill embodiment described herein.

TABLE 1

| Layer | Size In | Size Out | Kernel |
|---|---|---|---|
| conv1 | 227 × 227 × 3 | 55 × 55 × 96 | 11 × 11, 4 |
| pool1 | 55 × 55 × 96 | 27 × 27 × 96 | 3 × 3, 2 |
| conv2 | 27 × 27 × 96 | 27 × 27 × 256 | 5 × 5, 1 |
| pool2 | 27 × 27 × 256 | 13 × 13 × 256 | 3 × 3, 2 |
| conv3 | 13 × 13 × 256 | 13 × 13 × 384 | 3 × 3, 1 |
| conv4 | 13 × 13 × 384 | 13 × 13 × 384 | 3 × 3, 1 |
| conv5 | 13 × 13 × 384 | 13 × 13 × 256 | 3 × 3, 1 |
| pool5 | 13 × 13 × 256 | 6 × 6 × 256 | 3 × 3, 2 |
| fc1 | 6 × 6 × 256 | 1024 | |
| fc2 | 1024 | 128 | |
| L2 | 128 | 128 | |

In Table 1, the parameters in the Size In and Size Out columns follow the format of height×width×#kernels. The parameters in the Kernel column follow the format of height×width, stride. The network architecture of Gradient CNN and Grey CNN are the same as that shown in Table 1, except the Size In of conv1 is 227×227×1.

In one implementation, the CNNs may be trained using an Adaptive Moment Estimation (Adam) gradient descent optimization method with a batch size of 128 and a learning rate of 0.0001. During the first state of Student CNNs training where only triplet loss is involved, the dropout rate of Student CNNs is set to 0.5 and the training triplets are regenerated every 50K steps. During the second state of Student CNNs training where only Teacher CNNs are involved, the dropout rate of Student CNNs is still 0.5 while the dropout rate of Teacher CNNs is set to 0. By doing this, the Teacher CNNs can fully teach the Student CNNs without overfitting.

Finally, CNN feature extraction is generally computationally expensive since it involves massive amounts of convolution operations. However, when using three CNNs, each trained using triplet loss, the computational expense of feature extraction is even greater. Thus, to efficiently extract features from our multi-CNNs architecture, the system may be implemented such that it concatenates the color, grey and gradient images into a single five-channel image, where the first three channels are RGB, the fourth channel is grey, and the fifth channel is gradient. By doing this, a system can parallelize the computation across three CNNs to cut the inference runtime considerably.

1.3.5 Pill Retrieval

One feature of an image-based pill identification system is to compare a subject "real world" pill image presented by a user, with reference images of all pill classes and then output either the identity of the pill or a similarity ranking (which may be in descending order) indicating the most likely candidate identities of the subject pill. MobileDeepPill achieves this by measuring the similarity between the real-world subject image and reference pill images in the CNN feature space (e.g., by comparing feature arrays corresponding to the real-world subject image and feature arrays corresponding to the reference pill images). In one embodiment, the system normalizes each feature array to have a unit length and uses the cosine distance as the metric to determine a similarity score calculated as:

$$S = f(I_q)^T f(I_{ref}) \quad (3)$$

In the above, $I_q$ is the query consumer image and $I_{ref}$ is the reference image to which image $I_q$ is compared. In an embodiment such as MobileDeepPill that has three independent CNNs, three similarity scores $S_{color}$, $S_{gray}$ and $S_{gradient}$ are calculated. Finally, because color, shape and imprints are complementary information for identifying the pill, a final similarity score is calculated as the unweighted sum of $S_{color}$, $S_{gray}$ and $S_{gradient}$:

$$S_{final} = S_{color} + S_{gray} + S_{gradient} \quad (4)$$

However, in other embodiments the system may weight the similarity scores depending on certain factors. For example, when a color image has little difference in RGB data between the background and the image (indicating issues with ambient color casting or illumination problems), the $S_{color}$ score may be automatically weighted lower. The degree of lessened weighting may be a static, predetermined value, or may be proportionate to or a function of a detected lack of color contrast. Alternatively, the interface of the system may allow a user to either input information that dictates the proper weighting or simply directly adjust weightings (e.g., using touchscreen slider bars). Such inputted information may include, for example, checkboxes indicating whether the pill is the same color as the background, whether there are foreign objects in the image that could be confused as pills, whether the image is blurry or out of focus, whether the image contains shadows or shading, or other similar information.

In one implementation, given the query pill feature vector x and reference pill database organized as a matrix $D \in \mathbb{R}^{384 \times 2000}$, the system can be configured to perform pill retrieval by matrix-vector multiplication and obtain ranking scores $S = xD \in \mathbb{R}^{\times 2000}$. Then, the system may sort the ranking scores and return the top N pill candidates to the user (depending on design of the interface and/or user preferences) via a GUI of the system (e.g., system 100 of FIG. 10; smartphone 22 of FIG. 3). Alternatively, in some embodiments, only the pill candidate with the highest similarity score may be provided to the user via a GUI of the system.

1.3.6 System Diagram

Figure 10:
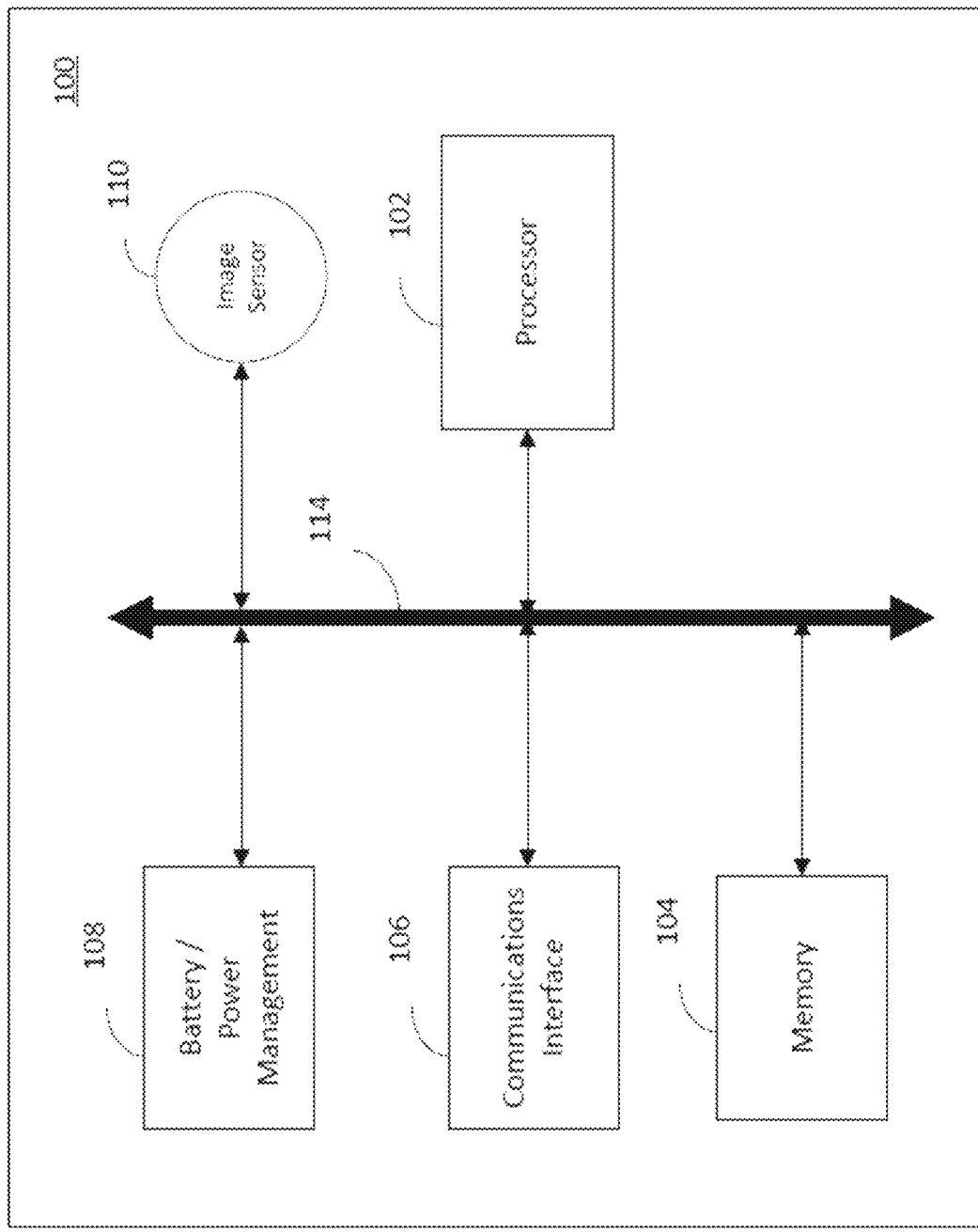
FIG. 10 is an illustrative block diagram of a system that may implement methods of object identification, in accordance with aspects of the present disclosure.

FIG. 10 shows a block diagram of an example system 100 (e.g., a pill recognition system; smartphone 22 of FIG. 3). As an illustrative, non-limiting example, system 100 could be a mobile electronic device (e.g., a mobile phone device, a tablet device, or any other portable electronic device) or may be implemented by a desktop or laptop computer or may be implemented by a cloud server.

System 100 includes a processor 102, a memory 104, a communications interface 106, an optional battery and power management module 108, and an image sensor 110. Some or all of these components may communicate over a bus 114. Although bus 114 is illustrated here as a single bus, it may instead be implemented as one or more busses, bridges, or other communication paths used to interconnect components of system 100. Memory 104 may be a nontransitory computer readable storage medium (e.g., read-only memory (ROM), random access memory (RAM), flash memory, etc.). Optional battery and power management module 108 may provide power to components of system 100 in a controlled manner, and may be optionally omitted in embodiments where system 100 is connected to a desktop or laptop computer (e.g., as a peripheral device). Image sensor 110 may include an optical image sensor, such as an RGB image sensor, capable of capturing images and video.

Processor 102 may execute instructions stored in memory 104 to process and classify one or more images captured by image sensor 110 (or received via electronic communications and stored in memory 104) as corresponding to a reference image of a known pill type stored in a database (e.g., database 42, FIG. 3). For example, some or all of the system architecture 17 of FIG. 3, the system 64 of FIG. 4, the system 84 of FIG. 5, and the method of FIG. 11 may be implemented by executing instructions on processor 102. Reference images determined to be most closely related to the captured image (e.g., where the pills of the reference images are determined to be most similar to the subject pill of the captured image) may be displayed on a graphical user interface (GUI) shown on a screen of the system 100.

In some embodiments, image sensor 110 may be external to system 100 and may provide data (e.g., images) to system 100 via a connection to communications interface 106. For example, image sensor 110 may be part of an auxiliary device coupled to system 100, which provides an enclosed, lighted chamber into which a pill to be identified may be inserted by a user, where an image of the pill may be subsequently captured by the image sensor 110. The enclosed chamber of the present example may provide a controlled environment for capturing an image of the pill, and may remove many environmental variables, such as variations in light intensity, partial shadowing, overlap of the pill by non-critical objects, etc. In this way, the pill may be identified more accurately, although this technique may use additional hardware or equipment.

1.3.7 Method of Pill Identification

Figure 11:
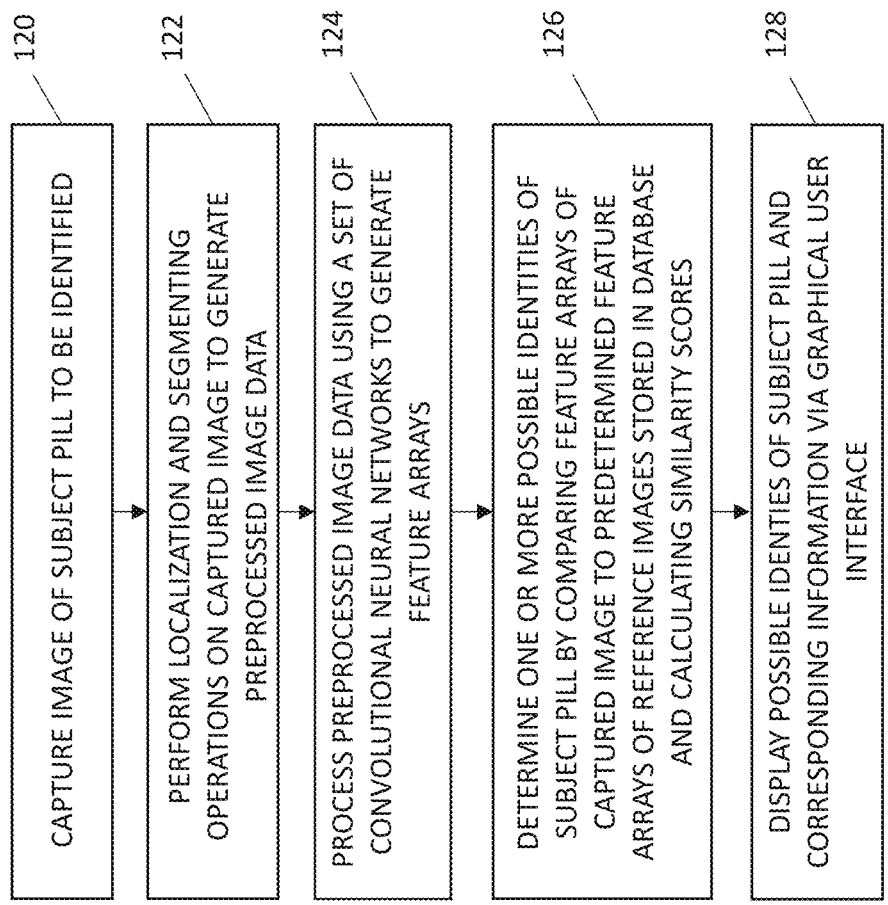
FIG. 11 is an illustrative process flow chart for a method of object identification using a deep neural network architecture, in accordance with aspects of the present disclosure.

FIG. 11 shows an illustrative process flow for a method of identification of a pill in accordance with embodiments of the present invention. For example, the method of FIG. 11 may be performed in connection with the system 100 of FIG. 10, the system architecture 17 of FIG. 3, the system 64 of FIG. 4, and/or the system 84 of FIG. 5.

At step 120, one or more images of a subject pill to be identified may be captured by an image sensor (e.g., the image sensor 110 of FIG. 10; an image sensor of the smartphone 22 of FIG. 3).

At step 122, a processor (e.g., processor 102 of FIG. 10; a processor of the smartphone 22 of FIG. 3) may execute instructions (e.g., stored in memory 104 of FIG. 10; stored in a memory of the smartphone 22 of FIG. 3) to perform localization and segmenting operations on the captured image or images to generate preprocessed image data. The preprocessed image data may include three different versions of the originally captured image, including a full color image, a greyscale image, and a gradient image (e.g., in which gradients within the image are highlighted).

At step 124, the processor may execute instructions to process the preprocessed image data using a set of trained convolutional neural networks (CNNs) (e.g., Color CNN 30, Gradient CNN 32, and Grey CNN 34 of FIG. 3) to generate feature arrays. Each feature array may, for example, respectively include information corresponding to features of the full color image, the grayscale image, and the gradient image.

At step 126, the processor may determine one or more possible identities of the subject pill by comparing the feature arrays to predetermined feature arrays of reference images stored in a database (e.g., a database stored in memory 104 of FIG. 10; database 42 of FIG. 3). The processor may then calculate similarity scores for each of the predetermined feature arrays to identify and rank a number of the reference images containing pills that are most similar to the subject pill.

At step 128, possible identities of the subject pill and (optionally) corresponding information about the possible identities may be displayed via a graphical user interface (GUI) (e.g., the GUI 44 of FIG. 3; the GUI shown on the screen of system 100 of FIG. 10).

1.4 CNN Model Compression for Pill Recognition

Although the multi-CNN pill recognition system and techniques described herein are able to extract complementary features that collectively capture the shape, color and imprints characteristics of pills, the size of such a system in terms of memory and computational needs is much higher than would ordinarily be usable or desirable for a mobile device such as a smartphone. In one embodiment, such a system might utilize a total of about 40 million parameters or more. Thus, the software code (when executed from a memory of a mobile device) would consume a tremendous amount of computations; in one embodiment approximately 6 billion FLOPS or more of computing power. The large amounts of parameters causes the system to have high memory demands, and the high FLOPS requirement makes the system very time consuming when executing the inference stage to analyze a pill image. As such, it is not feasible, or at least highly undesirable, to run the system's full multi-CNN model on mobile devices such as smartphones that are usually equipped with comparatively low computational power (CPUs or low-end GPUs) and relatively small available memory storage.

To address this challenge, MobileDeepPill adopts a novel deep learning model compression technique based on a concept that may be referred to as Knowledge Distillation. In a general sense, Knowledge Distillation for model compression can be thought of as a process of training a small network (i.e., student network) to imitates the outputs of the original network (i.e., teacher network) that needs to be compressed. Although some prior techniques have been proposed for model compression, they generally maintain the same network architecture and simply compress the network in a way that results in substantial and meaningful performance losses. In comparison, by following a number of optimization strategies, the systems and techniques disclosed herein achieve a new network architecture with a much smaller footprint. Moreover, these systems and techniques are framed as a learning problem which learns the parameters of the new network in an optimized non-lossy fashion.

1.4.1 Knowledge Distillation

Knowledge Distillation is a framework for model compression that aims to train a small deep network (i.e., student network) using the outputs of the original large deep network (i.e., teacher network). By doing it, the teacher network transfers the knowledge to the student network. In one implementation, Knowledge Distillation may be applied to object recognition, with the outputs of both the teacher and student networks being softmax outputs $P_t$=softmax($a_t^L$) and $P_s$=softmax($a_s^L$)

$$P_t^\tau = \text{softmax}\left(\frac{a_t^L}{\tau}\right) \quad (5)$$

$$P_s^\tau = \text{softmax}\left(\frac{a_s^L}{\tau}\right) \quad (6)$$

where $a^L$ is the activation of the last layer L and $\tau>1$ is the relaxation to soften the outputs of both teacher and student networks. Based on the softmax outputs, the student network is trained to optimize the following loss function:

$$\mathcal{L} = \mathcal{H}_{(y,P_s)} + \lambda \mathcal{H}_{(P_t^\tau, P_s^\tau)} \quad (7)$$

where $\mathcal{H}$ is the cross-entropy, y are true labels, and $\lambda$ controls how much knowledge should be transferred from the teacher network.

1.4.2 Design Factors for Compressed Student CNN for Pill Recognition

As noted above, one method for compressing the multi-CNN pill recognition system may maintain the recognition performance of the system while minimizing the computational cost (i.e., the number of FLOPS), network footprint (i.e., the numbers of CNN parameters), and memory needs. To achieve this, the MobileDeepPill system uses a layer replacement scheme, in which, at each time, one or a few layers are replaced by some other layers that preserve the recognition performance, without changing the rest of the layers. Based on this scheme, the teacher network architecture can be progressively modified, while examining the trade-offs between the recognition performance and the network architecture factors through a series of controlled experiments. This process not only leads to a small footprint student network that achieves equivalent recognition performance compared to its teacher network, but also helps formulate a number of strategies that can guide the design of a student network that achieves suitable model compression.

1.4.2.1 Late Downsampling ("Strategy 1")

Late downsampling involves maintaining large activation maps (i.e., the outputs of convolutional layers) at early layers and downsampling activation maps at later layers. Late downsampling not only helps reduce the number of network parameters but also leads to higher recognition performance by keeping activation maps at early layers large to preserve information contained in images. As such, when designing the student network, late downsampling can be performed to enhance recognition performance while reducing the number of network parameters.

1.4.2.2 Using 1×1 Filters for Channel Reduction ("Strategy 2")

When designing the student network, the system can insert a new convolutional layer that uses 1×1 filter before the first fully-connected layer. By doing so, the number of parameters of the first fully-connected layer can be significantly reduced. Such a 1×1 filter can significantly reduce the channel dimensions without sacrificing recognition accuracy.

1.4.2.3 Splitting One Convolutional Layer into Multiple Convolutional Layers with Filter Number Trade-Off ("Strategy 3")

Increasing network depth by adding extra layers can improve accuracy. However, adding extra layers also increases of the number of network parameters. As such, when designing the student network, one convolutional layer can be split into two convolutional layers to increase depth. Also, the filter number of the two new convolutional layers can be adjusted such that the number of parameters remains roughly the same or less. By doing this, the student network can become deeper without increasing the number of parameters.

1.4.2.4 Split One Convolutional Layer into Multiple Convolutional Layers with Filter Size Trade-Off ("Strategy 4")

The receptive field of a convolutional layer determines how much information is preserved in that layer and thus plays a key role in recognition performance. The receptive field of one convolutional layer with large filter size (e.g., 5×5, 7×7) is equivalent to stacking multiple 3×3 convolutional layers. Recognizing this can provide a way to increase the network depth by trading off filter size. As such, when designing the student network, one convolutional layer that uses larger filter size can be split into multiple 3×3 convolutional layers. By doing this, the student network can become deeper without losing the receptive field.

1.4.2.5 Reduce Filter Number without Splitting ("Strategy 5")

Continuing to increase the network depth does not necessarily lead to accuracy improvement because deeper networks are more difficult to train due to the degradation problem. As such, when designing the student network, the number of filters can be reduced when it is found that increasing the depth does not help improve accuracy. By doing this, the number of network parameters and FLOPS can be reduced.

1.4.3 Student Network Architecture

Figure 6:
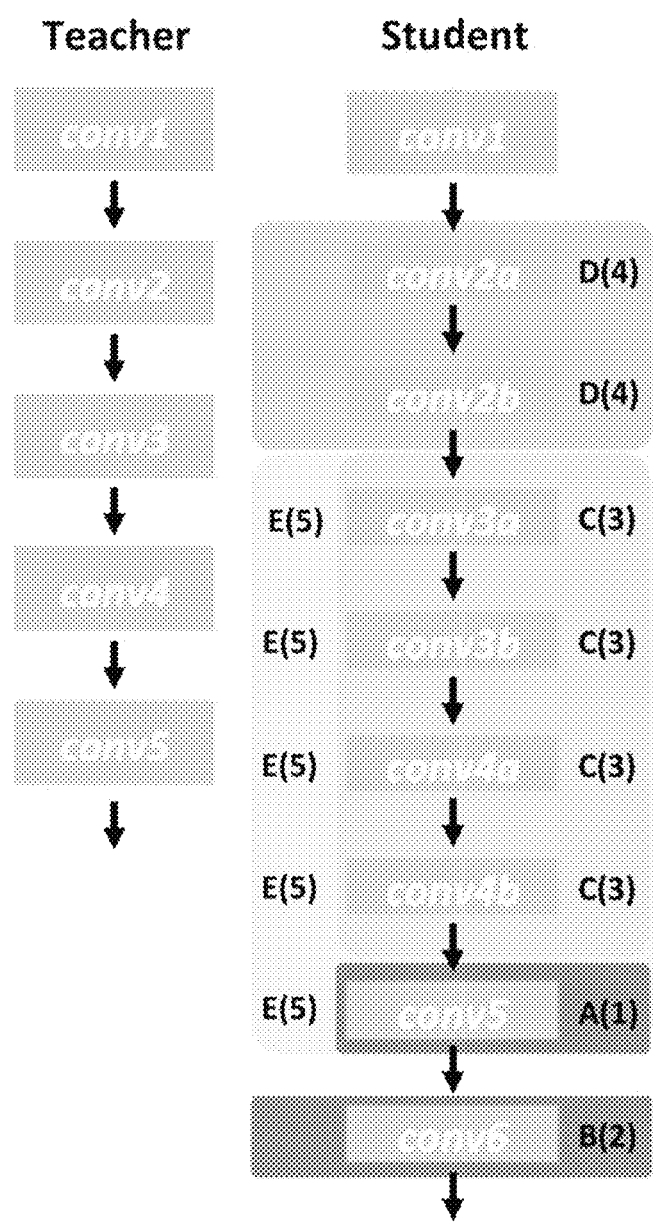
FIG. 6 is an illustrative block diagram comparing the network architecture of a teacher CNN to possible network architectures of a student CNN, in accordance with the present disclosure.

The design strategies described above gradually transform the teacher network into the student network. In this section, the models generated at each step are discussed. The model to be generated at the next step is built on top of the current model. To help illustrate the whole process, FIG. 6 illustrates the student network design process with the annotated strategy numbers and model symbols. Different sections of the Student network architecture shown in FIG. 6 use the syntax: model symbol (strategy number). Each model and strategy are described in detail below. Also listed are the numbers of network parameters and FLOPS for each model in Table 2 to illustrate the progress made at each step towards building a small footprint student network. Table 2 provides the numbers of network parameters and FLOPS for each model during the student network design process ("T" indicates Teacher in Table 2).

TABLE 2

|  | T | A | B | C | D | E |
|---|---|---|---|---|---|---|
| #params (m) | 13.32 | 6.24 | 4.49 | 4.34 | 3.69 | 1.76 |
| FLOPS (m) | 1093 | 984 | 973 | 985 | 676 | 407 |

Model A: Strategy 1 is used to derive this model. Specifically, late downsampling is performed at conv5 by changing its stride from 1 to 2. As a result, the number of parameters in fc1 is reduced by 75%, dropping from 1024×6×6×256 to 1024×3×3×256.

Model B: Strategy 2 is used to derive this model. Specifically, a new layer conv6 comprised of 64 1×1 filters is added after conv5. As a result, the network depth increases one, the channels of activation maps after conv6 are reduced to 64, and the number of parameters in fc1 is reduced by 75%, dropping from 1024×3×3×256 to 1024×3×3×64.

Model C: Strategy 3 is used to derive this model. Specifically, conv3 and conv4 are split into two thinner convolutional layers conv3a, conv3b and conv4a, conv4b respectively. As a result, the network depth increases two, and the filter number is reduced to 256.

Model D: Strategy 4 is used to derive this model. Specifically, conv2 is split into two thinner convolutional layers conv2a and conv2b. As a result, the network depth increases one, and the filter size is reduced to 3×3.

Model E (Final Student Network): Strategy 5 is used to derive this model. As a result, the numbers of filters in conv3a, conv3b, conv4a, conv4b, and conv5 layers are further reduced to 128.

Table 3 shows the details of the architecture of the teacher network of a Color CNN (e.g., Color CNN 56 of FIG. 3 or Color CNN 86 of FIG. 5), and Table 4 shows the details of the architecture of the student network of Color CNN (corresponding with Model E). For grey and gradient networks, the architecture is the same as the color network except for the first layer where the number of parameters is 12k and the number of FLOPS is 37.4 m. As shown in the tables, the student network has only 13.2% (1.76 m/13.32 m) of the parameters and 37.2% (0.407b/1.093b) of the FLOPS compared to its teacher network.

TABLE 3

| Layer | Size Out | Kernel | # params | FLOPS |
|---|---|---|---|---|
| conv1 | 55 × 55 × 96 | 11 × 11, 4 | 35k | 112.2 m |
| pool1 | 27 × 27 × 96 | 3 × 3, 2 | | |
| conv2 | 27 × 27 × 256 | 5 × 5, 1 | 615k | 447.9 m |
| pool2 | 13 × 13 × 256 | 3 × 3, 2 | | |
| conv3 | 13 × 13 × 384 | 3 × 3, 1 | 885k | 149.5 m |
| conv4 | 13 × 13 × 384 | 3 × 3, 1 | 1330k | 224.3 m |
| conv5 | 13 × 13 × 256 | 3 × 3, 1 | 885k | 149.5 m |
| pool5 | 6 × 6 × 256 | 3 × 3, 2 | | |
| fc1 | 1024 | | 9440k | 9.4 m |
| fc2 | 128 | | 131k | 0.1 m |
| Total | | | 13.32 m | 1093.0 m |

TABLE 4

| Layer | Size Out | Kernel | # params | FLOPS |
|---|---|---|---|---|
| conv1 | 55 × 55 × 96 | 11 × 11, 4 | 35k | 112.2 m |
| pool1 | 27 × 27 × 96 | 3 × 3, 2 | | |
| conv2a | 27 × 27 × 128 | 3 × 3, 1 | 111k | 80.6 m |
| conv2b | 27 × 27 × 128 | 3 × 3, 1 | 147k | 107.5 m |
| pool2 | 13 × 13 × 128 | 3 × 3, 2 | | |
| conv3a | 13 × 13 × 128 | 3 × 3, 1 | 148k | 24.9 m |
| conv3b | 13 × 13 × 128 | 3 × 3, 1 | 148k | 24.9 m |
| conv4a | 13 × 13 × 128 | 3 × 3, 1 | 148k | 24.9 m |
| conv4b | 13 × 13 × 128 | 3 × 3, 1 | 148k | 24.9 m |
| conv5 | 7 × 7 × 128 | 3 × 3, 2 | 148k | 6.2 m |
| conv6 | 7 × 7 × 64 | 1 × 1, 1 | 8k | 0.4 m |
| pool6 | 3 × 3 × 64 | | | |
| fc1 | 1024 | 3 × 3, 2 | 591k | 0.6 m |
| fc2 | 128 | | 131k | 0.1 m |
| Total | | | 1.76 m | 407.4 m |

In exemplary configurations, the teacher networks are the original color, grey and gradient CNNs described above. Given the newly designed student network architecture in this section, the Knowledge Distillation framework discussed above can be applied to train the student network.

The training process may include two steps. In the first step, the student network is allowed to learn by itself using triplet loss alone. In the second step, the teacher network is allowed to train and transfer knowledge to the student network. By doing this, the student network can learn the low-level features better and achieves much better generalization performance.

While teacher-student compression techniques have been described, it should be noted that other applicable compression techniques may be implemented in combination with or in place of these teacher-student compression techniques. For example, a quantization compression technique may be applied to reduce the number of bits of parameters of a trained CNN from 32 bits to 16 bits in order to halve the amount of memory space taken up by the trained CNN. As another example, a weight pruning compression technique may be applied to prune weights with small magnitudes of a trained CNN to reduce the memory footprint and computational cost. As another example, a Singular Vector Decomposition (SVD)-based compression technique may be applied to reduce the number of parameters of a trained.

2. EVALUATION OF AN EXEMPLARY IMPLEMENTATION

2.1 Experimental Setup

2.1.1 Dataset

Experiments were conducted using the official NIH NLM Pill Image Recognition Challenge dataset released in January 2016. The dataset has 1000 distinct pills and is composed of two categories of pill images:

Reference Images: This category contains 2000 reference images of the 1000 pills, with one image for the front side of the pill and one image for the back side of the pill. These reference images were captured under the same controlled laboratory conditions from a high-resolution camera directly above the front and the back sides of the pill.

Consumer Images: This category contains 5000 consumer images of the 1000 pills. These consumer images were taken by digital cameras in mobile phones in real-world settings. For each of the 1000 pills, there are about five consumer images taken under different conditions with variations in camera angle, illumination, and background.

2.1.2 Evaluation Metrics and Protocol

Evaluation Metrics: To evaluate the retrieval performance of MobileDeepPill, Mean Average Precision (MAP) and Top-K accuracy were used as the metrics.

MAP is the evaluation metric used in the official NIH NLM Pill Image Recognition Challenge. It is defined as:

$$\text{MAP} = \frac{1}{N}\sum_{i=1}^{N}\left(\frac{1}{N_i}\sum_{j=1}^{N_i}\frac{j}{MT(i,j)}\right) \quad (8)$$

where N denotes the number of query images used for evaluation. Ni is the number of genuine images which is always 2 because there are two sides for each pill. MT (i, j) are the rankings of two genuine images.

In practice, users are usually only interested in the top N pill candidates. Thus Top-K accuracy is employed as another metric to measure the retrieval performance of MobileDeep-Pill, which is defined as the ratio of the number of genuine images that rank within K to the number of query images.

As shown, in both schemes, Multi-CNNs (either Teacher or Student) outperforms Single-CNN by a large margin in all three metrics: MAP, Top-1 accuracy, and Top-5 accuracy. This result indicates the great superiority of Multi-CNNs network over Single-CNN network. Specifically, in one-side scheme, MAP is increased by 58% (from 24.2% to 38.2%); Top-1 accuracy is increased by 104% (from 26.0% to 53.1%), and Top-5 accuracy is increased by 56% (from 53.2% to 83.1%). In two-side scheme, MAP is increased by 47.6% (from 56.7% to 83.7%); Top-1 accuracy is increased by 71.9% (from 43.1% to 74.1%), and Top-5 accuracy is increased by 31.2% (from 73.5% to 96.4%). It is also worthwhile to note that both Single-CNN and Multi-CNNs achieve much better performance in two-side scheme than in one-side scheme. This indicates that providing both front and end sign image of the query pill can significantly enhance the recognition performance.

TABLE 5

| CNN(s) | One-Side Pill Recognition | | | Two-Side Pill Recognition | | |
| --- | --- | --- | --- | --- | --- | --- |
| | MAP | Top-1 | Top-5 | MAP | Top-1 | Top-5 |
| Single-CNN | 0.242 ± 0.008 | 26.0 ± 1.2% | 53.2 ± 1.9 | 0.567 ± 0.007 | 43.1 ± 1.2% | 73.5 ± 1.0% |
| Teacher | 0.382 ± 0.008 | 53.1 ± 1.0% | 83.1 ± 0.9% | 0.837 ± 0.007 | 74.1 ± 0.8% | 96.4 ± 0.8% |
| Student with KD | 0.375 ± 0.009 | 52.7 ± 1.1% | 81.7 ± 1.1% | 0.829 ± 0.007 | 73.7 ± 1.0% | 95.6 ± 0.5% |
| Student without KD | 0.353 ± 0.008 | 47.1 ± 1.0% | 76.6 ± 1.1% | 0.779 ± 0.007 | 67.5 ± 0.9% | 90.6 ± 0.7% |

Besides retrieval performance, we also evaluate the system performance of MobileDeepPill including runtime performance, runtime memory, and energy consumption.

Evaluation Protocol: In these experiments, 5-fold cross-validation was used as the evaluation protocol. Specifically, the inventors evenly split the 1000 pill classes into 5 folds, with the front side and back side of the same pill only in the same fold. As such, each fold contains 200 distinct pills with 400 reference images (two reference images for one pill) and about 1000 consumer images. During training, all the images in four folds are used. During evaluation, the consumer images in the remaining fold are used as query images and all the reference images in 5 folds as gallery images.

2.2 Pill Image Recognition Performance 2.2.1 Schemes

The recognition performance may be evaluated under two schemes:

One-Side Pill Recognition: In this scheme, the system takes one consumer image (either front side or back side) of a pill as the input.

Two-Side Pill Recognition: In this scheme, the system takes two consumer images (both front and back side) of the same pill as the input.

2.2.2 Superiority of Multi-CNNs Over Single-CNN

The recognition performance is presented in Table 5. Specifically, Single-CNN refers to the Single-CNN network (i.e., Color CNN); Teacher refers to the Multi-CNNs network discussed above; Student with KD refers to the compressed Multi-CNNs network using Knowledge Distillation method described above; and Student without KD refers to the compressed Multi-CNNs network without Knowledge Distillation technique.

2.2.3 Capability of Student Network

Even though the Student CNNs is 13.2% (1.76 m/13.32 m) of the Teacher CNNs in terms of the number of parameters, it achieves almost equivalent recognition performance compared to the Teacher CNNs. In one-side and two-side schemes, compared to the Teacher CNNs, the Student CNNs (with KD)'s MAP only drops 1.8% and 1.0%; Top-1 accuracy only drops 0.8% and 0.5%; and Top-5 accuracy only drops 1.7% and 0.8%. In contrast, the drop of Student CNNs without KD is significant: MAP drops 7.6% and 6.9%; Top-1 accuracy drops 11.3% and 8.9%; and Top-5 accuracy drops 7.8% and 6.0%. This result indicates the Student CNNs (with KD) successfully mimics the output of the Teacher CNNs. It also indicates that via the proposed the Teacher-Student optimization framework, the newly designed student network with a compressed architecture is able to efficiently absorb the knowledge transferred from the teacher network that has a much larger size.

Figure 7A:
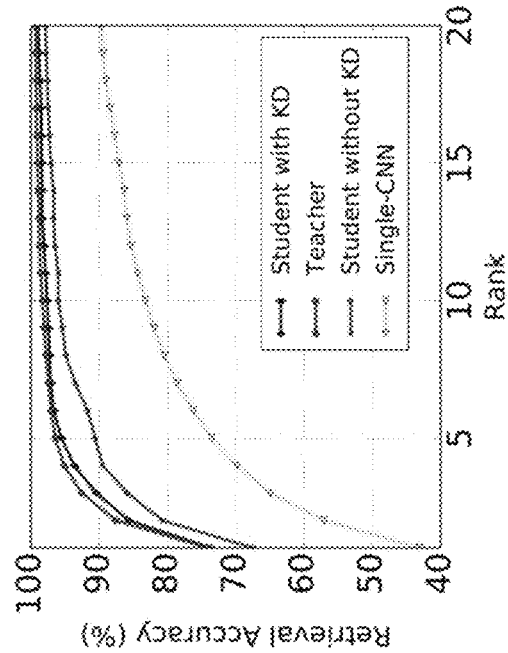
FIGS. 7A and 7B are illustrative graphs showing comparisons of the Cumulative Match Characteristic (CMC) curves of different network architectures, in accordance with aspects of the present disclosure.
Figure 7B:
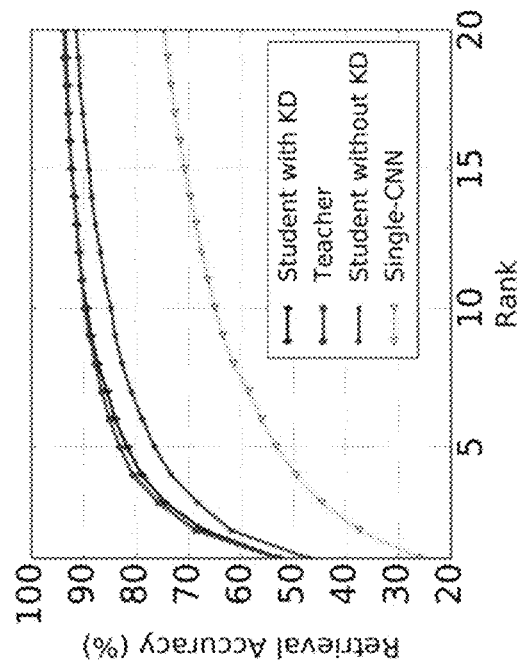

To provide a more illustrative way to compare performance, the Cumulative Match Characteristic (CMC) curve is plotted in FIGS. 7A and 7B. FIG. 7A shows the CMC curve of a one-side pill recognition scheme, while FIG. 7B shows the CMC curve of a two-side pill recognition scheme. In the CMC curve, the horizontal axis is the ranking K and the vertical axis is the corresponding Top-K accuracy. As shown, both the Student and Teacher CNNs consistently achieve higher accuracy from Top-1 to Top-20 than the Single-CNN in both one-side and two-side schemes. Moreover, the Student CNNs curve is closely aligned to the Teacher CNNs curve, demonstrating once again the capability of our Teacher-Student optimization framework.

2.3 System Performance

In this section, an evaluation of the system performance of MobileDeepPill is described, with respect to three different hardware platforms including a desktop computer, a mobile development platform, and a smartphone. To provide a comprehensive evaluation, the system performance of all the six models listed in Table 2 (i.e., Model T, A, B, C, D, and E) has been evaluated. In the following, their runtime performance, runtime memory performance, and power consumption respectively, are reported.

2.3.1 Runtime Performance

When running MobileDeepPill, a query of user is composed of four consecutive stages: (1) coarse-grained localization, (2) fine-grained localization, (3) feature extraction, and (4) pill retrieval. The runtime performance of all of these four stages is examined below.

Table 6 lists the runtime performance of stage (1), (2), and (4) (unit: milliseconds). Since the computing operations included in these stages only involve CPU, the runtime listed in Table 6 is CPU runtime. As shown, among the three platforms, the smartphone achieves the worst runtime performance. This is expected because smartphone has the least powerful CPU. In addition, among the three stages, fine-grained localization has the worst runtime. This is because it involves HOG feature extract that is time consuming.

TABLE 6

| Platform | coarse-grained | fine-grained | pill retrieval |
|---|---|---|---|
| Desktop | 0.2 | 6.1 | 1.2 |
| Mobile Development Board | 0.5 | 39.8 | 2.7 |
| Smartphone | 47.2 | 165.1 | 39.4 |

Next, the runtime performance of stage (3) of all six CNN models is evaluated. For the desktop and mobile development board platforms, the runtime on both CPU and GPU is examined. For the smartphone, only the runtime on CPU is examined. The inventors ran an experiment involving 2000 inferences and report the average runtime.

Figure 8C:
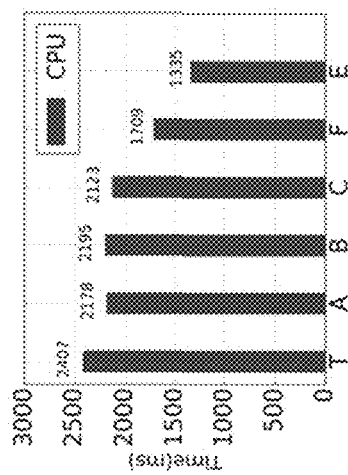
FIGS. 8A-8C are illustrative graphs showing the runtime performance of six CNN models across three different platforms, in accordance with aspects of the present disclosure.
Figure 8B:
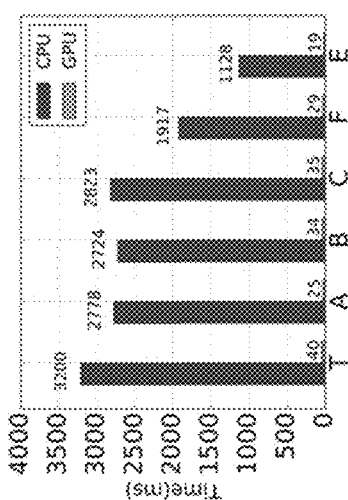
Figure 8A:
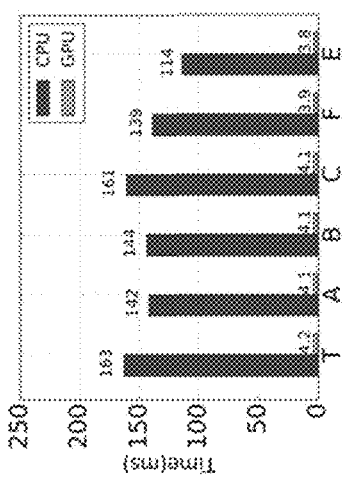

FIGS. 8A-8C show the runtime performance of the six CNN models on the three platforms. In general, the runtime is reduced as CNN compression level increases. In FIG. 8A, the reduction on the desktop is not large. Model E still costs 70.0% of the Model T in CPU mode and 90.5% in GPU mode. Even though the desktop does not benefit much from CNN compression, the reduction on mobile devices is obvious. As illustrated in FIG. 8C, the runtime is reduced by 44.5% (from 2407 ms to 1335 ms) on the smartphone. In FIG. 8B, the runtime reduction is even more remarkable. Model E only requires 35.3% time in CPU mode and 47.5% in GPU mode compared to Model T. Finally, it can be seen that the reduction in runtime is not as significant as the reduction in FLOPS. One can appreciate that this is due, in part, to there being certain parallel operations in CNN inference implementation. Hence, the reduction in FLOPS does not necessarily directly reflect the reduction in runtime. As an example, in the desktop's GPU mode, the runtime barely changes as the model size decreases. This is due to the operations on the desktop GPU being highly parallel.

2.3.2 Runtime Memory Performance

Next the runtime memory cost of all six CNN models on the three platforms in CPU and GPU mode is reported. Because memory allocation highly depends on operating system and it is difficult to unravel the memory usage for each part, the memory usage is not broken down. There are two types of heaps on Android Platform, Dalvik Heap and Native Heap. When using MXNet on Android, it only affects Native Heap. Thus we only report Native Heap usage for the smartphone. To fairly measure the memory cost, Garbage Collection operation is invoked each time before we measure the Native Heap usage. For the mobile development board and the desktop, we report physical RAM usage and GPU memory usage. To clearly reflect the influence of the CNN model, for the mobile development board and the desktop, we report the RAM usage that is subtracted by the RAM usage without loading CNN model. The RAM usage without loading CNN model is 124 MB on the desktop and 54 MB on the mobile development board.

Figure 9C:
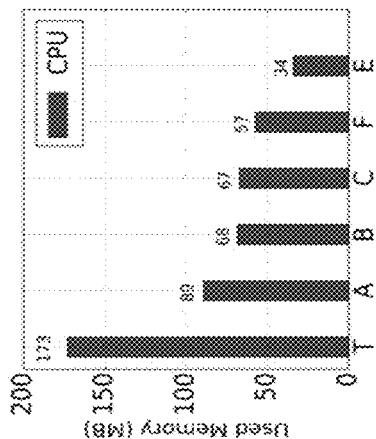
FIGS. 9A-9C are illustrative graphs showing memory usage for six CNN models across three different platforms, in accordance with aspects of the present disclosure.
Figure 9B:
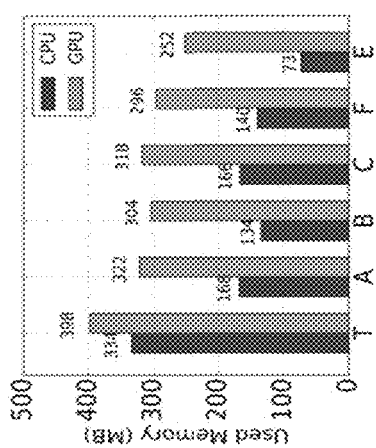
Figure 9A:
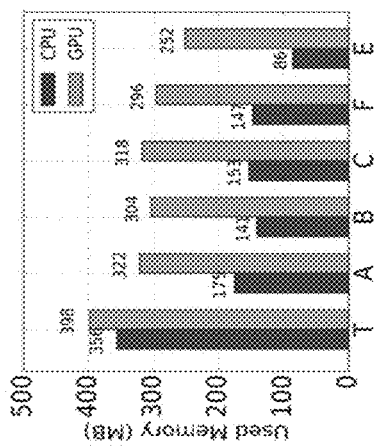

FIGS. 9A-9C shows the memory usage for all six CNN models on three platforms. As shown, the runtime memory is reduced across all the platforms in CPU and GPU mode. In FIG. 9A and FIG. 9B, the desktop and the mobile development board share the same GPU memory usage, decreasing from 398 MB to 252 MB. In FIG. 9A, the runtime physical memory usage in CPU mode is reduced by 75.8%, from 356 MB to 86 MB. In FIG. 9B, the CPU mode memory cost is reduced by 78.1%, from 334 MB to 73 MB. Finally, in FIG. 9C, the required Native Heap size is reduced by 80.3%, from 173 MB to 34 MB.

2.3.3 Power Consumption

To evaluate the power consumption, we use Monsoon Power Monitor [3] to measure the power consumption of the smartphone in CPU mode. We use PWRcheck DC power analyzer [5] to measure the power consumption of the mobile development board in both CPU and GPU mode. We report the estimated number of queries that can be completed using a fully-charged smartphone. We run 2000 queries and report the average power consumption.

Table 7 and Table 8 show the power consumption of the smartphone and the mobile development board respectively. As shown, across all the stages, the most power hungry stage is the CNN-based feature extraction, which is more than 5000 mW. This is expected because CNN contains much more amount of computing operations than any other stage. We also notice that the power consumption based on the student network is 5.5% less than the teacher network. This indicates model compression is playing a role in reducing power consumption.

TABLE 7

| Stage | Power(mW) | Time (ms) | Energy(mJ) |
|---|---|---|---|
| sleep | 39.7 | — | — |
| screen-on | 567.6 | — | — |
| app-on | 1180.9 | — | — |
| coarse-grained | 2895.1 | 47 | 136 |
| fine-grained | 2473.5 | 165 | 408 |
| teacher inference | 5546.2 | 2407 | 13349 |
| student inference | 5243.8 | 1335 | 6999 |
| pill retrieval | 3042.7 | 39 | 119 |

TABLE 8

| Stage | Power(mW) | Time (ms) | Energy(mJ) |
|---|---|---|---|
| idle | 3564.9 | — | — |
| coarse-grained | 5711.3 | 0.5 | 3 |
| fine-grained | 5849.5 | 39.8 | 233 |
| teacher (CPU) | 5836.4 | 3200.5 | 18679 |
| student (CPU) | 5712.3 | 1128.2 | 6443 |

TABLE 8-continued

| Stage | Power(mW) | Time (ms) | Energy(mJ) |
|---|---|---|---|
| teacher (GPU) | 11763.4 | 40.8 | 480 |
| student (GPU) | 9378.7 | 19.1 | 179 |

Finally, we estimate the number of queries that can be completed using a fully-charged 3.85V 3600 mAh battery. As listed in Table 9, when the teacher network is used, the smartphone can process a total number of 3561 queries. In comparison, when the student network is used, the smartphone can process a total number of 6512 queries, which is 82.8% more than the teacher network.

TABLE 9

| Platform | Model | CPU | GPU |
|---|---|---|---|
| Smartphone | teacher | 3561 | — |
|  | student | 6512 | — |
| Mobile Develoment Board | teacher | 2635 | 67978 |
|  | student | 7450 | 115233 |

3. ALTERNATIVE EMBODIMENTS AND APPLICATIONS

It should be noted that the exemplary implementations of MobileDeepPill described above utilize new models, modules, components, and techniques that can be applied to the development of a wider range of applications beyond simply automated pill detection via smartphone.

3.1 Additional Pill Recognition

First, the advantages of MobileDeepPill can also be realized through use of devices other than smartphones. For example, tablets or specialized devices could be used to implement MobileDeepPill, such as handheld readers or all-in-one portable devices. As will be understood, a user's device could be used for MobileDeepPill so long as it is capable of allowing a user to obtain a digital image of a pill, and has some minimum amount of processing power and memory sufficient to power on-device deep learning algorithms. Alternatively, where data security is sufficiently reliable over a network connection, a simple device with a camera and networking capability (e.g., NFC, Bluetooth, or WiFi) could interface with another computing device that, e.g., runs the Student or Teacher CNN learning algorithms and returns the pill identification information.

In addition, in any such embodiments, additional functionality can be added beyond simply recognition of a pill. For example, the system could be configured to be used as a poison control aid (e.g., for parents) to determine what type of pill was inadvertently consumed and then supply (e.g., through a network connection to a poison control database) information on what steps should be taken. Or, alternatively, the system could be configured to simply automatically dial the local poison control number for the geographic location of the user (or a national or custom number) and then automatically (or upon user input) email or otherwise transfer data on the pill to a poison control representative on the phone. As another example, the system could be configured to use the identification of a pill to link case reports or other data within a law enforcement database to provide related information to an officer. As a further example, the system could be used to identify a pill and automatically send a refill request to a pharmacy based on the pill information and user profile. And, the system may be used to automatically update a patient's electronic health record to monitor treatment adherence and/or drug interaction and safety (for example, when a user consumes multiple types of medication, whether prescription or over the counter), based on a user taking a picture of a pill each time one is consumed.

3.2 Non-Pill Embodiments

The inventors have recognized that the novel aspects of MobileDeepPill that make it advantageous for use in automated, mobile pill recognition can now also have applicability in different applications, to recognize and identify objects other than pills. For example, a small footprint, self-contained, multi-CNN image analysis architecture as described above for MobileDeepPill can also be trained to identify other objects that have known attributes (such as shape, color, size, imprints, designs, etc.) such as currency, security badges, event passes or tickets, equipment components, inventory, keys, batteries, known illicit drugs or other contraband, and the like. And, the results of the analysis may include identification of the object and/or detection of whether, for example, the objects are counterfeit, OEM, etc. Similarly, such an image analysis architecture could be used for medical image identification and classification.

3.3 Multi-Input Embodiments

In another alternative embodiment, the multi-CNNs architecture discussed above can be used to build mobile sensing systems that perform inferences based on combining knowledge extracted from multiple sensor modalities. For example, a mobile device running an image analysis architecture as disclosed herein could utilize an additional (or replacement) CNN that is trained to recognize features in a laser contour scan, a temperature/infrared scan, weight measurement, volume measurement, ultrasound scan, barcode scan, or other similar scan.

3.4 Adaptions to Existing Learning Models

Moreover, the proposed deep learning model optimization technique can allow practitioners who want to adopt large deep learning models (custom or off-the-shelf) to generate small-footprint models for resource-limited platforms like smartphones.

The invention claimed is:
1. A method for pill identification comprising:
obtaining, via an electronic device, an image of a subject pill to be identified;
preprocessing the image to obtain at least a coarse location of the subject pill, using at least one of a processor of the electronic device and a processor of a cloud server;
generating feature arrays corresponding to features of the image using each of a set of convolutional neural networks (CNNs) running on at least one of the processor of the electronic device and the processor of the cloud server;
determining a probable identity of the subject pill based on the feature arrays generated by the set of CNNs; and
communicating the probable identity of the subject pill for a user via a screen of the electronic device.

2. The method of claim 1, wherein at least one of the CNNs is a student CNN trained to mimic a feature identification of a trained teacher CNN.

3. The method of claim 1, wherein at least one CNN of the set of CNNs is trained using sample images created by using data augmentation to mimic noise.

4. The method of claim 1 wherein a subset of the feature arrays generated by at least one of the CNNs identifies features that minimize differences between images of pills of a given pill type and reference images of pills of the given pill type, while maximizing differences between the images of pills of the given pill type and reference images of pills of pill types that are different from the given pill type.

5. The method of claim 1 wherein obtaining the image of the subject pill comprises:
capturing, with an image sensor of the electronic device, the image of the subject pill to be identified in a non-controlled setting.

6. The method of claim 1, wherein each of the steps of obtaining, preprocessing, identifying, determining, and communicating are performed solely using resources of the electronic device.

7. The method of claim 1, wherein determining the probable identity of the subject pill based on the feature arrays generated by the set of CNNs comprises:
determining final similarity scores for each reference image of a plurality of reference images stored in at least one of a database of the electronic device and a database of the cloud server, wherein each reference image shows a pill of a different pill type;
identifying a first reference image of the plurality of reference images having a highest final similarity score of the final similarity scores; and
determining that a first pill type depicted in the first reference image is the probable identity of the subject pill.

8. The method of claim 7, wherein determining final similarity scores for each reference image of the plurality of reference images comprises:
calculating a first similarity score by multiplying a transpose of a first feature array of the feature arrays by a first predetermined feature array corresponding to a given reference image;
calculating a second similarity score by multiplying a transpose of a second feature array of the feature arrays by a second predetermined feature array corresponding to the given reference image;
calculating a third similarity score by multiplying transpose of a third feature array of the feature arrays by a third predetermined feature array corresponding to the given reference image; and
calculating a final similarity score for the given reference image by summing the first, second, and third similarity scores.

9. The method of claim 8, wherein the first feature array is generated by a color CNN that processes a full color version of the image, the second feature array is generated by a gradient CNN that processes a gradient version of the image in which gradients are highlighted, and the third feature array is generated by a gray CNN that processes a greyscale version of the image.

10. The method of claim 7, further comprising:
identifying a second reference image of the plurality of reference images having a second highest final similarity score of the final similarity scores;
determining that a second pill type depicted in the second reference image is an additional probable identity of the subject pill; and
displaying the additional probable identity of the subject pill via the screen of the electronic device.

11. The method of claim 2, wherein the student CNN is trained using softmax outputs of the trained teacher CNN to minimize a loss function.

12. The method of claim 11, wherein the loss function is calculated based at least partly on cross entropy between first softmax outputs of the trained teacher CNN and second softmax outputs of the student CNN.

13. The method of claim 2, further comprising:
training a teacher CNN using a triplet-based loss function to produce the trained teacher CNN.

14. The method of claim 13, wherein the triplet-based loss function receives, as inputs when a first pill type is being considered, an anchor pill image taken in an uncontrolled setting and corresponding to the first pill type, a positive pill image taken in a controlled setting and corresponding to the first pill type, and a negative pill image corresponding to a second pill type that is different from the first pill type.

15. A system for automated pill identification using convolutional neural networks (CNNs), the system comprising:
a camera;
a user interface;
a processor; and
a memory having instructions executable by the processor, wherein, when executed, the instructions causing the processor to:
receive an image of a subject pill to be identified, wherein the image is captured by the camera;
process the image using at least two CNNs to generate feature arrays for the image, wherein the CNNs are trained to identify features of the subject pill relevant to known distinguishing attributes of various pill types;
compare the generated feature arrays to predetermined feature arrays corresponding to a plurality of reference images stored in a database; and
display, via the user interface, at least one probable identification of the subject pill.

16. The system of claim 15, wherein one of the at least two CNNs is a student CNN trained to mimic a feature identification of a trained teacher CNN.

17. The system of claim 15, wherein the at least one probable identification of the subject pill is determined based on the comparison between the generated feature arrays and the predetermined feature arrays.

18. The system of claim 17, wherein, when executed, the instructions further cause the processor to:
determine similarity scores for each of the plurality of reference images stored in the database of the system, wherein each reference image shows a pill of a different pill type;
identify a first reference image of the plurality of reference images having a highest similarity score of the similarity scores; and
determine that the at least one probable identification of the subject pill includes a first pill type depicted in the first reference image.

19. The system of claim 18, wherein when the processor determines similarity scores for each reference image of the plurality of reference images, the instructions further cause the processor to:
calculating a first similarity score by multiplying a transpose of a first feature array of the feature arrays by a first predetermined feature array of the predetermined feature arrays, wherein the first predetermined feature array corresponds to a given reference image;

calculating a second similarity score by multiplying a transpose of a second feature array of the feature arrays by a second predetermined feature array of the predetermined feature arrays, wherein the second predetermined feature array corresponds to the given reference image;

calculating a final similarity score for the given reference image by summing the first and second similarity scores.

20. The system of claim 19, wherein the first feature array is generated by a color CNN that processes a full color version of the image, the second feature array is generated by a gradient CNN that processes a gradient version of the image in which gradients are highlighted.

21. The system of claim 19, wherein the first feature array is generated by a color CNN that processes a full color version of the image, the second feature array is generated by a grey CNN that processes a greyscale version of the image.

22. The system of claim 17, wherein, when executed, the instructions further cause the processor to:

identify a second reference image of the plurality of reference images having a second highest similarity score of the similarity scores;

determine that the at least one probable identification of the subject pill includes a second pill type depicted in the second reference image.

23. A method for determining a probable identity of a subject pill, the method comprising:

capturing, with an image sensor of an electronic device, an image of the subject pill;

performing, with a processor of the electronic device, data preprocessing on the image to produce a first version of the image and a second version of the image;

processing, with a first trained convolutional neural network (CNN), the first version of the image to produce a first feature array;

processing, with a second trained CNN, the second version of the image to produce a second feature array;

calculating similarity scores for each of a plurality of reference images stored in a database of the electronic device by multiplying transposed versions of the first and second feature arrays by predetermined feature arrays of each of the plurality of reference images;

identifying a reference image of the plurality of reference images having the highest similarity score; and displaying information corresponding to a pill shown in the identified reference image as a probable identity of the subject pill via a graphical user interface of the electronic device.

24. The method of claim 23, wherein the first trained CNN is trained using full color images, the second trained CNN is trained using gradient images in which gradients are highlighted, the first version of the image is a full color image, and the second version of the image is a gradient image.

25. The method of claim 23, wherein the first trained CNN is trained using full color images, the second trained CNN is trained using greyscale images, the first version of the image is a full color version of the image, and the second version of the image is a greyscale version of the image.

26. An electronic system comprising:
a camera;
a screen;
a processor coupled to the camera; and
a memory device coupled to the processor, comprising instructions, which, when executed, cause the processor to:

receive from the camera an image of a subject pill to be identified;

preprocess the image to obtain at least a coarse location of the subject pill;

generate feature arrays corresponding to features of the image using each of a set of convolutional neural networks (CNNs) running on the processor;

determine a probable identity of the subject pill based on the feature arrays generated by the set of CNNs; and communicate the probable identity of the subject pill via the screen.

27. The electronic system of claim 26, wherein at least one of the CNNs is a student CNN trained to mimic a feature identification of a trained teacher CNN.

28. The electronic system of claim 26, wherein at least one CNN of the set of CNNs is trained using sample images created by using data augmentation to mimic noise.

29. The electronic system of claim 26, wherein a subset of the feature arrays generated by at least one of the CNNs identifies features that minimize differences between images of pills of a given pill type and reference images of pills of the given pill type, while maximizing differences between the images of pills of the given pill type and reference images of pills of pill types that are different from the given pill type.

30. The electronic system of claim 26, wherein, to determine the probable identity of the subject pill based on the feature arrays generated by the set of CNNs, the instructions, when executed, cause the processor to:

determine final similarity scores for each reference image of a plurality of reference images stored a database of the memory device of the electronic device, wherein each reference image shows a pill of a respectively different pill type;

identify a first reference image of the plurality of reference images having a highest final similarity score of the final similarity scores; and determine that a first pill type depicted in the first reference image is the probable identity of the subject pill.

31. The electronic system of claim 30, wherein, to determine the final similarity scores for each reference image of the plurality of reference image, the instructions, when executed, cause the processor to:

calculate a first similarity score by multiplying a transpose of a first feature array of the feature arrays by a first predetermined feature array corresponding to a given reference image;

calculate a second similarity score by multiplying a transpose of a second feature array of the feature arrays by a second predetermined feature array corresponding to the given reference image;

calculate a third similarity score by multiplying transpose of a third feature array of the feature arrays by a third predetermined feature array corresponding to the given reference image; and calculate a final similarity score for the given reference image by summing the first, second, and third similarity scores.

32. The electronic system of claim 31, wherein the first feature array is generated by a color CNN that processes a full color version of the image, the second feature array is generated by a gradient CNN that processes a gradient version of the image in which gradients are highlighted, and the third feature array is generated by a gray CNN that processes a greyscale version of the image.

33. The electronic system of claim 30, wherein the instructions, when executed, cause the processor to:
- identify a second reference image of the plurality of reference images having a second highest final similarity score of the final similarity scores;
- determine that a second pill type depicted in the second reference image is an additional probable identity of the subject pill; and
- display the additional probable identity of the subject pill via the screen of the electronic device.

* * * * *